(12) United States Patent
Choi et al.

(10) Patent No.: US 12,101,019 B2
(45) Date of Patent: Sep. 24, 2024

(54) ELECTRONIC DEVICE AND METHOD OF OPERATING THE SAME

(71) Applicant: Samsung Electronics Co., Ltd., Suwon-si (KR)

(72) Inventors: Hangseok Choi, Suwon-si (KR); Chuleun Yun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/989,144

(22) Filed: Nov. 17, 2022

(65) Prior Publication Data

US 2023/0105095 A1 Apr. 6, 2023

Related U.S. Application Data

(63) Continuation of application No. PCT/KR2022/014634, filed on Sep. 29, 2022.

(30) Foreign Application Priority Data

Oct. 1, 2021 (KR) .................. 10-2021-0130692

(51) Int. Cl.
*H02M 1/00* (2007.01)
*G09G 3/3225* (2016.01)
(Continued)

(52) U.S. Cl.
CPC .......... *H02M 1/007* (2021.05); *G09G 3/3225* (2013.01); *H02M 3/07* (2013.01); *H02M 3/1582* (2013.01); *G09G 2330/023* (2013.01)

(58) Field of Classification Search
CPC ...... H02M 1/007; H02M 3/07; H02M 3/1582; H02M 3/158; G09G 3/3225; G09G 2330/023; G09G 2330/028
See application file for complete search history.

(56) References Cited

U.S. PATENT DOCUMENTS 8,035,633 B2 * 10/2011 Park .................... G09G 3/3241
345/36
8,643,637 B2 * 2/2014 Lee ........................ H02M 3/00
345/212
(Continued)

FOREIGN PATENT DOCUMENTS

JP 2006-340436 A 12/2006
JP 5960817 B2 8/2016
(Continued)

OTHER PUBLICATIONS

International Search Report dated Jan. 6, 2023, issued in International Patent Application No. PCT/KR2022/014634.

*Primary Examiner* — Christopher E Leiby
(74) *Attorney, Agent, or Firm* — Jefferson IP Law, LLP

(57) ABSTRACT

An electronic device is provided. The electronic device includes a display including a display driver integrated circuit (IC), a power supply device configured to supply driving power to the display, a processor operatively connected to the display driver IC and the power supply device, and a memory operatively connected to the processor. The memory may store instructions that, when executed, cause the processor to control the power supply device to supply different driving power depending on a display mode of the display.

22 Claims, 10 Drawing Sheets

(51) Int. Cl.
*H02M 3/07* (2006.01)
*H02M 3/158* (2006.01)

(56) References Cited

U.S. PATENT DOCUMENTS

| | | | |
|---|---|---|---|
| 10,103,620 B1* | 10/2018 | Wei | H02M 3/156 |
| 10,958,166 B1* | 3/2021 | Low | H02M 3/07 |
| 11,128,219 B1* | 9/2021 | Hsieh | H02M 3/07 |
| 11,196,339 B1* | 12/2021 | Jodka | H02M 1/08 |
| 2005/0052170 A1* | 3/2005 | Kim | H02M 3/07 |
| | | | 323/282 |
| 2010/0033467 A1* | 2/2010 | Park | H02M 3/155 |
| | | | 307/31 |
| 2014/0159611 A1 | 6/2014 | Elferich et al. | |
| 2014/0210437 A1 | 7/2014 | Chen | |
| 2015/0301675 A1 | 10/2015 | Sharma et al. | |
| 2016/0049872 A1* | 2/2016 | Park | H02M 3/1582 |
| | | | 345/212 |
| 2016/0239040 A1 | 8/2016 | Ripley | |
| 2018/0376252 A1* | 12/2018 | King | H04R 17/00 |
| 2019/0172379 A1* | 6/2019 | Park | H02M 3/158 |
| 2019/0228694 A1 | 7/2019 | Lee et al. | |
| 2019/0379288 A1* | 12/2019 | Chaput | H02M 3/33576 |
| 2020/0144916 A1* | 5/2020 | Lee | H02M 1/36 |
| 2020/0286432 A1* | 9/2020 | Zhang | G09G 3/3266 |
| 2021/0043132 A1 | 2/2021 | Nam | |
| 2021/0090506 A1* | 3/2021 | Kim | G09G 3/20 |
| 2021/0146909 A1 | 5/2021 | Serrano et al. | |
| 2021/0295782 A1 | 9/2021 | Bae et al. | |
| 2021/0391795 A1* | 12/2021 | Gandhi | H02M 3/1582 |
| 2022/0199008 A1 | 6/2022 | Lee | |
| 2022/0416664 A1* | 12/2022 | Wu | H02M 1/36 |

FOREIGN PATENT DOCUMENTS

| | | |
|---|---|---|
| JP | 2019-012668 A | 1/2019 |
| JP | 6525475 B2 | 6/2019 |
| JP | 2019-165625 A2 | 9/2019 |
| KR | 10-2016-0021956 A | 2/2016 |
| KR | 10-2018-0065271 A | 6/2018 |
| KR | 10-2018-0077410 A | 7/2018 |
| KR | 10-2019-0059625 A | 5/2019 |
| KR | 10-2019-0066104 A | 6/2019 |
| KR | 10-2019-0090899 A | 8/2019 |
| KR | 10-2020-0017705 A | 2/2020 |
| KR | 10-2020-0076903 A | 6/2020 |
| KR | 10-2021-0054181 A | 5/2021 |
| KR | 10-2021-0065763 A | 6/2021 |
| KR | 10-2021-0143073 A | 11/2021 |
| KR | 10-2022-0089884 A | 6/2022 |

* cited by examiner

ELECTRONIC DEVICE AND METHOD OF OPERATING THE SAME

CROSS-REFERENCE TO RELATED APPLICATION(S)

This application is a continuation application, claiming priority under § 365(c), of an International application No. PCT/KR2022/014634, filed on Sep. 29, 2022, which is based on and claims the benefit of a Korean patent application number 10-2021-0130692, filed on Oct. 1, 2021, in the Korean Intellectual Property Office, the disclosure of which is incorporated by reference herein in its entirety.

TECHNICAL FIELD

The disclosure relates to an electronic device and a method of operating the same. More particularly, the disclosure relates to an electronic device capable of addressing an issue of reducing battery usage time due to switching loss of an inverting buck-boost converter circuit by outputting ELVDD of about 4.6V and ELVSS of about −2.3V, and a method of operating the same.

BACKGROUND ART

A display of electronic devices is a key technology in the information and communication era and is developing into a thinner, lighter, and portable display with high performance. Recently, an organic light-emitting diode (OLED) display having a faster response than a liquid crystal panel, reduced thickness, and excellent visibility has been applied. The OLED display may include a light-emitting diode (LED) and a driving circuit for supplying current to the LED. A power supply device of the OLED display may supply a positive-level voltage (e.g., ELVDD voltage) and a negative-level voltage (e.g., ELVSS voltage). Since the electronic device is intended for portability, a battery may be used as a power source. For driving the OLED display, the power supply device may generate a positive-level voltage (e.g., ELVDD voltage) of about 4.6V using a boost converter and generate a negative-level voltage (e.g., ELVSS voltage) of about −4.4V using a buck-boost converter. The absolute value of the negative-level voltage (e.g., ELVSS voltage) may be lowered depending on screen brightness, and the negative-level voltage (e.g., ELVSS voltage) may be lowered up to about −2V in the case of a low-power display operation (e.g., an always-on display (AOD)). In order to minimize power consumption of the battery in the operating of the low-power display, the buck-boost efficiency must be maintained high.

The above information is presented as background information only to assist with an understanding of the disclosure. No determination has been made, and no assertion is made, as to whether any of the above might be applicable as prior art with regard to the disclosure.

DISCLOSURE

Technical Problem

Compared to a buck or boost converter, a buck-boost circuit has a higher voltage applied to a switch thereof under the same input/output conditions and a larger ripple of inductor current, resulting in greater loss during switching operation, so the efficiency thereof may be low. The OLED display operates with minimum power consumption in the case of a low-power display operation (e.g., an AOD) in which ELVSS is set to about −2V, thereby consuming only a minimum current of about 10 mA. Here, under the condition of the minimum power consumption, the ratio of switching loss in the buck-boost circuit may increase, so that the efficiency thereof may be lowered to 60% or less, thereby reducing the battery usage time.

According to various embodiments of the disclosure, when the OLED display operates in the minimum power consumption mode (e.g., an AOD), the operation of an inverting buck-boost converter circuit may be stopped and a boost converter circuit may be operated.

Aspects of the disclosure are to address at least the above-mentioned problems and/or disadvantages and to provide at least the advantages described below. Accordingly, an aspect of the disclosure is to provide an electronic device capable of addressing the issue of reducing battery usage time due to switching loss of the inverting buck-boost converter circuit by outputting ELVDD of about 4.6V and ELVSS of about −2.3V, and a method of operating the same.

The technical issue to be addressed in this document are not limited to the technical issue mentioned above, and other technical problems that are not mentioned may be clearly understood by those of ordinary skill in the art to which this document belongs from the description below.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes a display including a display driver integrated circuit (IC), a power supply device configured to supply driving power to the display, a processor operatively connected to the display driver IC and the power supply device, and a memory operatively connected to the processor, wherein the memory may store instructions that, when executed, cause the processor to control the power supply device to supply different driving power depending on a display mode of the display.

In accordance with another aspect of the disclosure, a method of operating an electronic device is provided. The method includes determining whether a display operates in a normal display mode or a low-power display mode. A power supply device configured to supply driving power to the display may be controlled to supply different driving power depending on the normal display mode and the low-power mode.

Advantageous Effects

In an electronic device according to various embodiments of the disclosure, the operation of an inverting buck-boost converter circuit may be stopped in a low-power display (e.g., an AOD) mode, thereby blocking outputs of the inverting buck-boost converter circuit. Here, a charge pump circuit may supply −Vo/2 voltage (e.g., about −2.3V) to a display panel. A positive-level voltage (e.g., ELVDD voltage) is controlled to about 4.6V, and the voltage obtained from the charge pump circuit may be converted into a negative-level voltage (e.g., ELVSS voltage) of about −2.3V. A negative-level voltage (e.g., ELVSS voltage) of about −2.3V may be supplied to the display panel. A pulse voltage having a peak-to-peak ripple corresponding to ½ of an output voltage may be produced in the switching node VLX of a boost converter circuit. It is possible to continuously secure power corresponding to ½ of the output voltage using a pulse voltage corresponding to ½ of the output voltage. An electronic device and a method of operating the same according to various embodiments of the disclosure may improve the efficiency of a power supply device when the OLED display operates in a power consumption mode (e.g., an AOD), thereby increasing battery usage time of the electronic device.

Other aspects, advantages, and salient features of the disclosure will become apparent to those skilled in the art from the following detailed description, which, taken in conjunction with the annexed drawings, discloses various embodiments of the disclosure

DESCRIPTION OF DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

MODE FOR INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
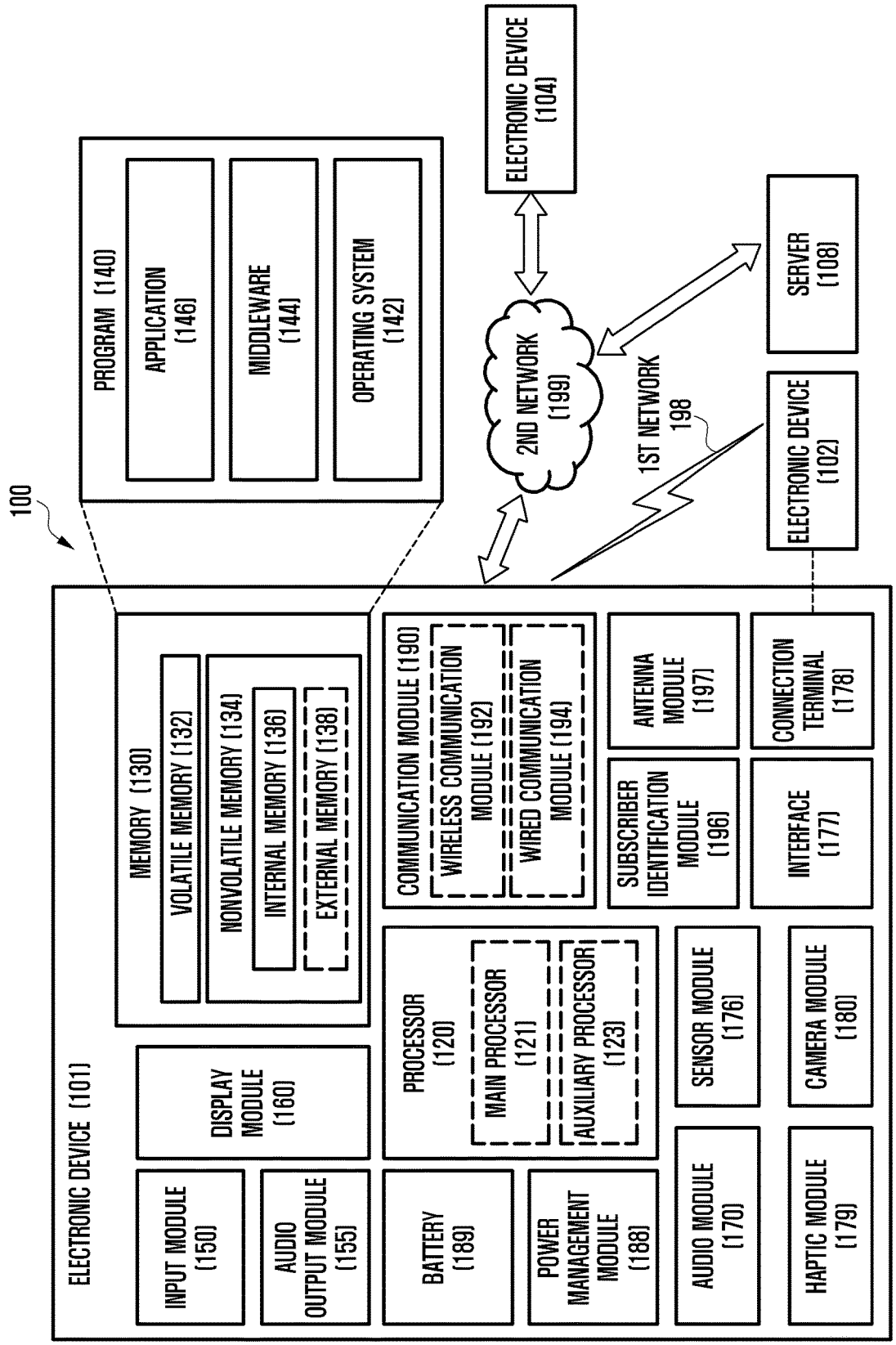
FIG. 1 is a block diagram of an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or at least one of an external electronic device 104 or a server 108 via a second network 199 (e.g., a long-range wireless communication network). According to an embodiment of the disclosure, the electronic device 101 may communicate with the external electronic device 104 via the server 108. According to an embodiment of the disclosure, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments of the disclosure, at least one of the components (e.g., the connecting terminal 178) may be omitted from the electronic device 101, or one or more other components may be added in the electronic device 101. In some embodiments of the disclosure, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., a sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the displays, hologram device, and projector. According to an embodiment of the disclosure, the display module 160 may include a touch sensor adapted to detect a touch, or a pressure sensor adapted to measure the intensity of force incurred by the touch.

The audio module 170 may convert a sound into an electrical signal and vice versa. According to an embodiment of the disclosure, the audio module 170 may obtain the sound via the input module 150, or output the sound via the sound output module 155 or a headphone of an external electronic device (e.g., an external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to an embodiment of the disclosure, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a $5^{th}$ generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a $4^{th}$ generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter (mm) Wave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large-scale antenna. The wireless communication module 192 may support various requirements specified in the electronic device 101, an external electronic device (e.g., the external electronic device 104), or a network system (e.g., the second network 199). According to an embodiment of the disclosure, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1ms or less) for implementing URLLC.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., a printed circuit board (PCB)). According to an embodiment of the disclosure, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

According to various embodiments of the disclosure, the antenna module 197 may form a mmWave antenna module. According to an embodiment of the disclosure, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment of the disclosure, the external electronic device 104 may include an internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smailphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

According to an embodiment of the disclosure, the display module 160 shown in FIG. 1 may include a variable display (e.g., a flexible display) (e.g., a stretchable display) (e.g., an expandable display) that is configured such that the area (e.g., a screen size) thereof may be expanded in a first direction (e.g., the vertical direction or the y-axis direction).

According to an embodiment of the disclosure, the display module 160 shown in FIG. 1 may include a variable display (e.g., a flexible display) (e.g., a stretchable display) (e.g., an expandable display) that is configured such that the area (e.g., a screen size) thereof may be expanded in a second direction (e.g., the horizontal direction or the x-axis direction) perpendicular to the first direction (e.g., the vertical direction or the y-axis direction).

According to an embodiment of the disclosure, the display module 160 shown in FIG. 1 may include a variable display (e.g., a flexible display) (e.g., a stretchable display) (e.g., an expandable display) that is configured such that the area (e.g., a screen size) thereof may be expanded in a first direction (e.g., the vertical direction or the y-axis direction) and a second direction (e.g., the horizontal direction or the x-axis direction).

According to an embodiment of the disclosure, the display module 160 shown in FIG. 1 may include a flexible display configured to be folded or unfolded.

According to an embodiment of the disclosure, the display module 160 shown in FIG. 1 may include a flexible display that is slidably disposed to provide a screen (e.g., a display screen).

According to an embodiment of the disclosure, the display module 160 may be referred to as a variable display (e.g., a stretchable display), an expandable display, or a slide-out display.

According to an embodiment of the disclosure, the display module 160 shown in FIG. 1 may include a bar type display or a plate type display.

Figure 2:
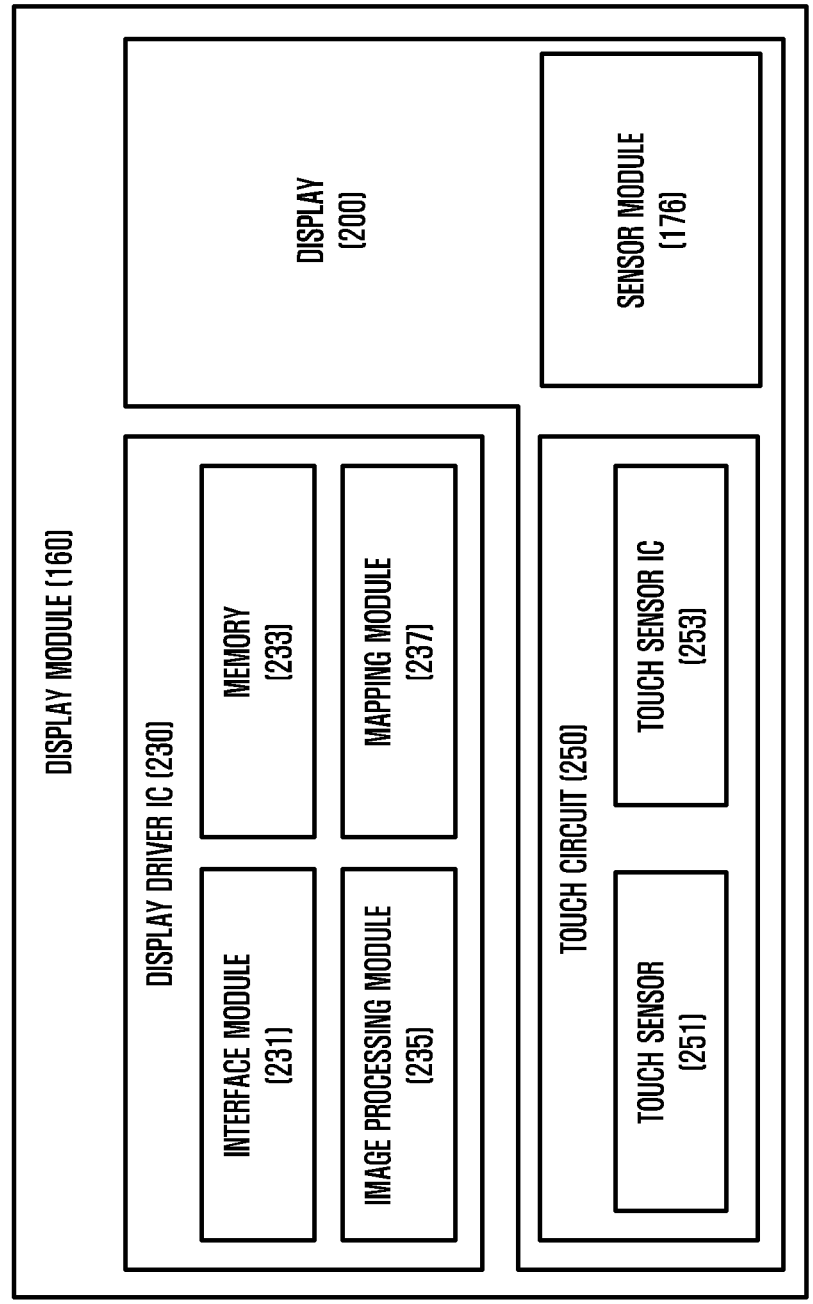
FIG. 2 is a block diagram of a display module according to an embodiment of the disclosure.

FIG. 2 is a block diagram of a display module according to an embodiment of the disclosure.

Referring to FIG. 2, a display module 160 may include a display 200 and a display driver IC 230 (hereinafter, referred to as a "DDI 230") for controlling the display 200.

The DDI 230 may include an interface module 231, a memory 233 (e.g., a buffer memory), an image processing module 235, and/or a mapping module 237.

According to an embodiment of the disclosure, the DDI 230 may receive image data or image information including an image control signal corresponding to a command for controlling the image data from other elements of an electronic device (e.g., the electronic device 101 in FIG. 1) through the interface module 231.

According to an embodiment of the disclosure, the image information may be received from a processor (e.g., the processor 120 in FIG. 1) (e.g., the main processor 121 in FIG. 1) (e.g., an application processor) or a coprocessor (e.g., the coprocessor 123 in FIG. 1) (e.g., a graphic processing unit) that is operated independently of functions of the main processor 121.

According to an embodiment of the disclosure, the DDI 230 may communicate with a touch circuit 250 or a sensor module 176 through the interface module 231. In addition, the DDI 230 may store at least some of received image information in the memory 233. For example, the DDI 230 may store at least some of received image information in the memory 233 in units of frames.

According to an embodiment of the disclosure, the image processing module 235 may pre-process or post-process at least some of the image data, based at least on the characteristics of the image data or the characteristics of the display 200 (e.g., adjusting resolution, brightness, or size).

According to an embodiment of the disclosure, the mapping module 237 may generate a voltage value or a current value corresponding to the image data that is pre-processed or post-processed through the image processing module 235. In an embodiment of the disclosure, generation of the voltage value or the current value may be performed based on, for example, at least some of the attributes (e.g., arrangement of pixels (red green blue (RGB) stripes or pentile structures) or the size of each sub-pixel) of pixels of the display 200.

As an embodiment of the disclosure, at least some pixels of the display 200 may be driven based at least in part on the voltage value or the current value to display visual information (e.g., text, images, and/or icons) corresponding to the image data on the display 200.

According to an embodiment of the disclosure, the display module 160 may further include a touch circuit 250. The touch circuit 250 may include a touch sensor 251 and a touch sensor IC 253 for controlling the same.

As an embodiment of the disclosure, the touch sensor IC 253 may control the touch sensor 251 to detect a touch input or a hovering input onto a specific position of the display 200. For example, the touch sensor IC 253 may measure a change in a signal (e.g., voltage, light amount, resistance, or charge amount) for a specific position of the display 200, thereby detecting a touch input or a hovering input. The touch sensor IC 253 may provide information (e.g., the position, area, pressure, or time) regarding the detected touch input or hovering input to the processor (e.g., the processor 120 in FIG. 1).

According to an embodiment of the disclosure, at least a part (e.g., the touch sensor IC 253) of the touch circuit 250 may be included as a part of the display driver IC 230 or display 200.

According to an embodiment of the disclosure, at least a part (e.g., the touch sensor IC 253) of the touch circuit 250 may be included as a part of another element (e.g., the coprocessor 123) disposed outside the display module 160.

According to an embodiment of the disclosure, the display module 160 may further include at least one sensor (e.g., an extension detection sensor, a fingerprint sensor, an iris sensor, a pressure sensor, or an illuminance sensor) of the sensor module 176, or a control circuit therefor. In this case, the at least one sensor or the control circuit therefor may be embedded in a part (e.g., the display 200 or the DDI 230) of the display module 160 or a part of the touch circuit 250. For example, in the case where the sensor module 176 embedded in the display module 160 includes a biometric sensor (e.g., a fingerprint sensor), the biometric sensor may obtain biometric information (e.g., a fingerprint image) related to a touch input through a partial area of the display 200. As another example, in the case where the sensor module 176 embedded in the display module 160 includes a pressure sensor, the pressure sensor may obtain pressure information related to a touch input through a partial or the entire area of the display 200. As another example, in the case where the sensor module 176 embedded in the display module 160 includes an extension detection sensor, the extension detection sensor may detect a change in the area (e.g., a screen size) of the display (e.g., a variable display). According to an embodiment of the disclosure, the touch sensor 251 or the sensor module 176 may be disposed between pixels of the pixel layer of the display 200 or above or below the pixel layer.

Figure 3A:
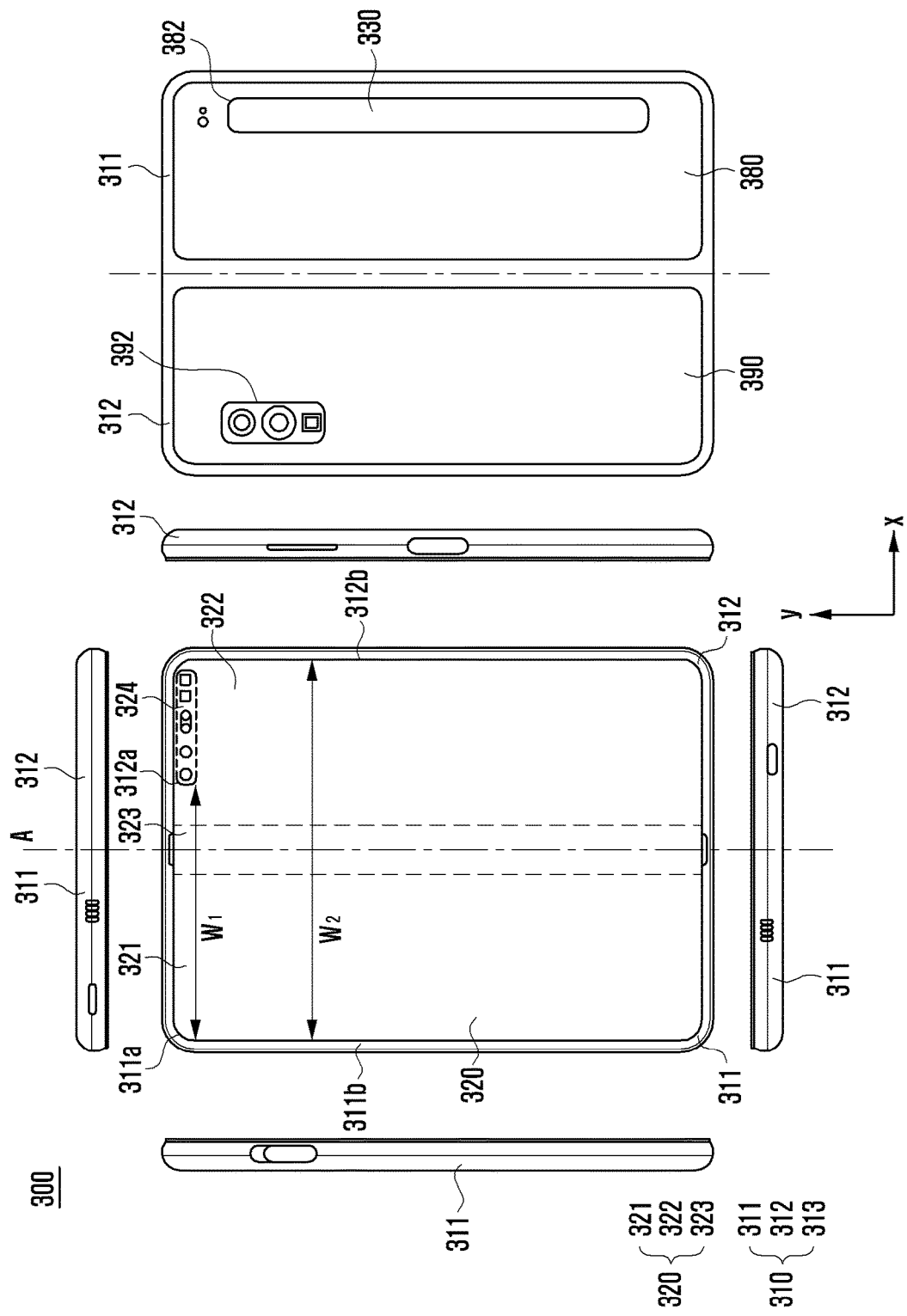
FIG. 3A is a diagram illustrating a first state (e.g., a flat state or an open state) of an electronic device according to an embodiment of the disclosure.
Figure 3B:
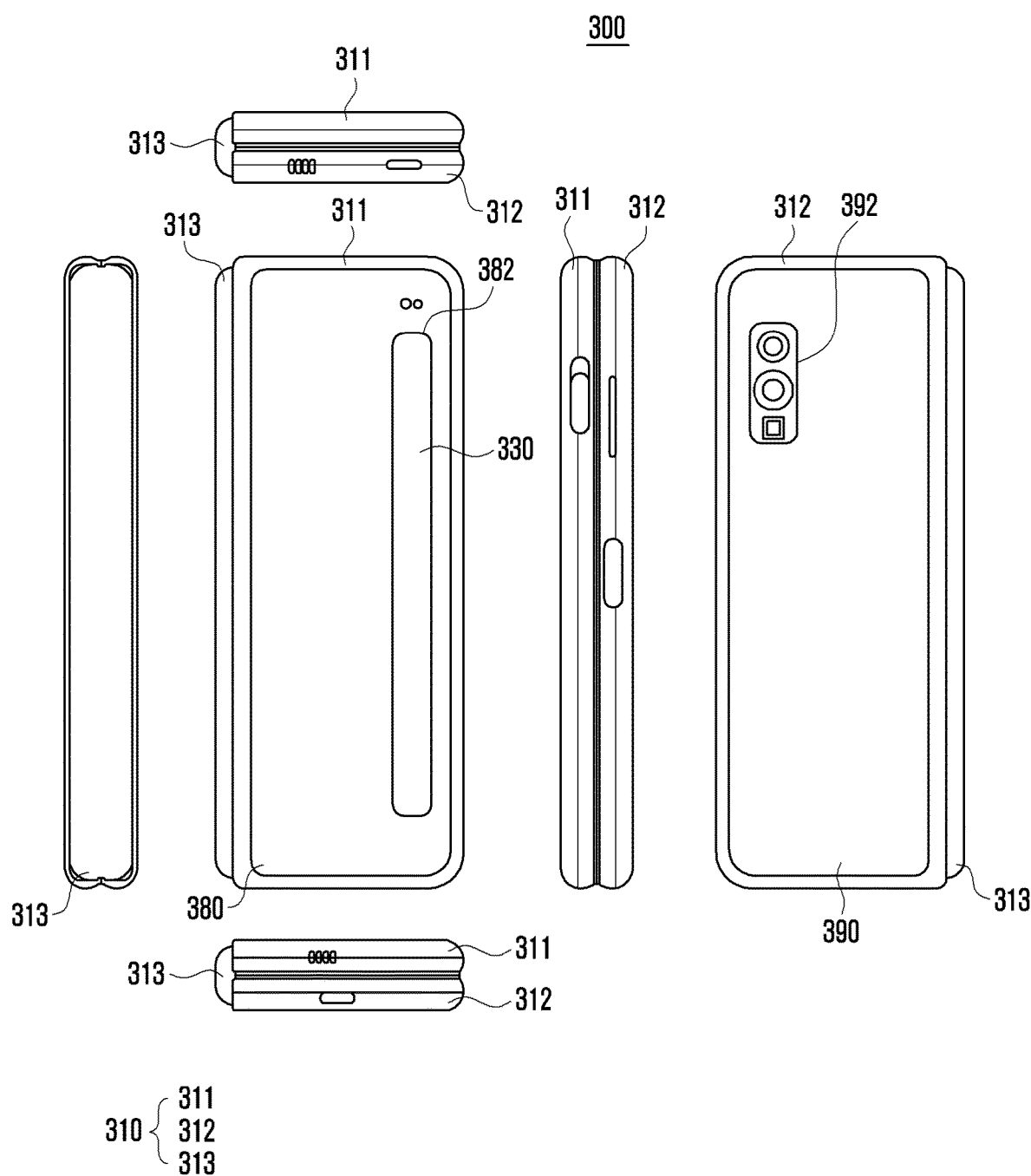
FIG. 3B is a diagram illustrating a second state (e.g., a folded state or a closed state) of an electronic device according to an embodiment of the disclosure.

FIG. 3A is a diagram illustrating a first state (e.g., a flat state or an open state) of an electronic device according to an embodiment of the disclosure. FIG. 3B is a diagram illustrating a second state (e.g., a folded state or a closed state) of an electronic device according to an embodiment of the disclosure.

Referring to FIGS. 3A and 3B, an electronic device 300 (e.g., the electronic device 101 in FIG. 1) may include a housing 310 and a display 320 disposed in a space formed by the housing 310. As an embodiment of the disclosure, the display 320 may include a flexible display or a foldable display.

The surface on which the display 320 is disposed may be defined as a first surface or a front surface of the electronic device 300 (e.g., a surface on which a screen is displayed when unfolded). In addition, the surface opposite the front surface may be defined as a second surface or a rear surface of the electronic device 300. In addition, a surface surrounding the space between the front surface and the rear surface may be defined as a third surface or a side surface of the electronic device 300. For example, the electronic device 300 may be configured such that the folding region 323 may be folded or unfolded about a folding axis (e.g., the axis A) in a second direction (e.g., the x-axis direction).

In an embodiment of the disclosure, the housing 310 includes a first housing structure 311, a second housing structure 312 including a sensor area 324, a first rear cover 380, a hinge cover 313, and a second rear cover 390. The housing 310 of the electronic device 101 is not limited to the shape and coupling shown in FIGS. 3A and 3B, and may be implemented by a combination and/or coupling of other shapes or components. For example, in another embodiment of the disclosure, the first housing structure 311 and the first rear cover 380 may be integrally formed, and the second housing structure 312 and the second rear cover 390 may be integrally formed.

As an embodiment of the disclosure, the first housing structure 311 and the second housing structure 312 may be disposed on both sides of the folding axis A and may have an overall symmetrical shape with respect to the folding axis A. The first housing structure 311 and the second housing structure 312 may have different angles or distances therebetween depending on whether the electronic device 300 is in a flat state (e.g., a first state), a folded state (e.g., a second state), or an intermediate state (e.g., a third state) (e.g., half-folded state).

In an embodiment of the disclosure, the second housing structure 312, unlike the first housing structure 311, may further include the sensor area 324 in which various sensors (e.g., an illuminance sensor, an iris sensor, and/or an image sensor) are disposed, but may have an overall symmetrical shape in other regions, excluding the sensor area.

As an embodiment of the disclosure, at least one sensor (e.g., a camera module, an illuminance sensor, an iris sensor, and/or an image sensor) may be disposed in the lower portion and/or bezel area of the display as well as in the sensor area 324.

In an embodiment of the disclosure, the first housing structure 311 and the second housing structure 312 may together form a recess for accommodating the display 320. In the illustrated embodiment of the disclosure, the recess may have two or more different widths in a direction (e.g., the x-axis direction) perpendicular to the folding axis A due to the sensor area 324.

For example, the recess may have a first width W1 between a first portion 311a of the first housing structure 311 and a first portion 312a of the second housing structure 312 formed in the periphery of the sensor area 324 of the second housing structure 312. The recess may have a second width W2 formed by a second portion 311b of the first housing structure 311, which is parallel to the folding axis A, and a second portion 312b of the second housing structure 312, which does not belong to the sensor area 324 of the second housing structure 312 and is parallel to the folding axis A. In this case, the second width W2 may be formed to be greater than the first width W1. In other words, the first portion 311a of the first housing structure 311 and the first portion 312a of the second housing structure 312, which have a mutually asymmetric shape, may form the first width W1 of the recess. The second portion 311b of the first housing structure 311 and the second portion 312b of the second housing structure 312, which have a mutually symmetrical shape, may form the second width W2 of the recess.

As an embodiment of the disclosure, the first portion 312a and the second portion 312b of the second housing structure 312 may have different distances from the folding axis A. The widths of the recess are not limited to the illustrated example. In various embodiments of the disclosure, the recess may have a plurality of widths depending on the shape of the sensor area 324 or the asymmetric shape of the first housing structure 311 and the second housing structure 312.

In an embodiment of the disclosure, at least a portion of the first housing structure 311 and the second housing structure 312 may be formed of a metal material or a non-metal material having a rigidity selected to support the display 320.

As an embodiment of the disclosure, the sensor area 324 may be formed to have a predetermined area adjacent to one corner of the second housing structure 312. However, the arrangement, shape, and size of the sensor area 324 are not limited to the illustrated examples. For example, in another embodiment of the disclosure, the sensor area 324 may be provided at another corner of the second housing structure 312 or at any area between the top and bottom corners.

As an embodiment of the disclosure, components for performing various functions embedded in the electronic device 300 may be exposed on the front surface of the electronic device 300 through the sensor area 324 or through one or more openings provided in the sensor area 324. In various embodiments of the disclosure, the components may include various types of sensors. The sensors may include, for example, at least one of an illuminance sensor, a front camera (e.g., a camera module), a receiver, and a proximity sensor.

The first rear cover 380 may be disposed on one side of the folding axis A and on the rear surface of the electronic device, and may have, for example, a substantially rectangular periphery surrounded by the first housing structure 311. Likewise, the second rear cover 390 may be disposed on the other side of the folding axis A and on the rear surface of the electronic device, and its periphery may be surrounded by the second housing structure 312.

In the illustrated embodiment of the disclosure, the first rear cover 380 and the second rear cover 390 may have a substantially symmetrical shape with respect to the folding axis A. However, the first rear cover 380 and the second rear cover 390 do not necessarily have a symmetrical shape, and in another embodiment of the disclosure, the electronic device 300 may include the first rear cover 380 and second rear cover 390 having various shapes. In another embodiment of the disclosure, the first rear cover 380 may be integrally formed with the first housing structure 311, and the second rear cover 390 may be integrally formed with the second housing structure 312.

As an embodiment of the disclosure, the first rear cover 380, the second rear cover 390, the first housing structure 311, and the second housing structure 312 may form a space in which various components (e.g., a printed circuit board or a battery) of the electronic device 300 may be disposed. As an embodiment of the disclosure, one or more components may be disposed on the rear surface of the electronic device 300 or visually exposed therethrough. For example, at least a portion of a sub-display 330 may be visually exposed through a first rear area 382 of the first rear cover 380. In another embodiment of the disclosure, one or more components or sensors may be visually exposed through a second rear area 392 of the second rear cover 390. In various embodiments of the disclosure, the sensor may include an illuminance sensor, a proximity sensor, and/or a rear camera.

As an embodiment of the disclosure, the hinge cover 313 may be disposed between the first housing structure 311 and the second housing structure 312 to cover internal components (e.g., a hinge structure). The hinge cover 313 may cover a portion where the first housing structure 311 and the second housing structure 312 are in contact with each other by unfolding and folding the electronic device 300.

As an embodiment of the disclosure, the hinge cover 313 may be covered by a portion of the first housing structure 311 and the second housing structure 312 or may be exposed to the outside depending on the state of the electronic device 101 (a flat state or a folded state). As an embodiment of the disclosure, when the electronic device 101 is in the flat state, the hinge cover 313 may be covered by the first housing structure 311 and the second housing structure 312 so as not to be exposed. As an embodiment of the disclosure, when the electronic device 101 is in the folded state (e.g., a fully folded state), the hinge cover 313 may be exposed to the outside between the first housing structure 311 and the second housing structure 312. As an embodiment of the disclosure, when the first housing structure 311 and the second housing structure 312 are in the intermediate state in which they are folded with a certain angle, the hinge cover 313 may be partially exposed to the outside between the first housing structure 311 and the second housing structure 312. However, in this case, the exposed area may be smaller than that in the fully folded state. As an embodiment of the disclosure, the hinge cover 313 may include a curved surface.

The display 320 may be disposed in a space formed by the housing 310. For example, the display 320 may be seated on the recess formed by the housing 310 and may constitute most of the front surface of the electronic device 300.

Accordingly, the front surface of the electronic device 300 may include the display 320, and a partial region of the first housing structure 311 and a partial region of the second housing structure 312, which are adjacent to the display 320. In addition, the rear surface of the electronic device 300 may include a first rear cover 380, a partial region of the first housing structure 311 adjacent to the first rear cover 380, a second rear cover 390, and a partial region of the second housing structure 312 adjacent to the second rear cover 390.

The display 320 may indicate a display in which at least a partial region thereof may be deformed into a flat or curved surface. As an embodiment of the disclosure, the display 320 may include a folding region 323, a first region 321 disposed on one side (e.g., the left side in FIG. 3A) of the folding region 323, and a second region 322 disposed on the other side (right side in FIG. 3A) thereof.

As an embodiment of the disclosure, the display 320 may include a top-emission type or bottom-emission type OLED display. The OLED display may include a low-temperature color filter (LTCF) layer, window glass (e.g., ultra-thin glass (UTG) or polymer window), and an optical compensation film (OCF). Here, the LTCF layer of the OLED display may be replaced by a polarizing film (or polarizing layer).

The display 320 is divided into regions by way of example, and the display 320 may be divided into a plurality (e.g., two or more) regions according to a structure or functions thereof. As an embodiment of the disclosure, the display 320 may be divided into regions by the folding region 323 or folding axis A extending parallel to the y-axis, but in another embodiment of the disclosure, the display 320 may be divided into regions, based on another folding region (e.g., a folding region parallel to the x-axis) or another folding axis (e.g., a folding axis parallel to the x-axis).

As an embodiment of the disclosure, the first region 321 and the second region 322 may have an overall symmetrical shape with respect to the folding region 323.

Hereinafter, the operation of the first housing structure 311 and the second housing structure 312 depending on the state of the electronic device 300 (e.g., a flat state and a folded state), and the respective regions of the display 320 will be described.

As an embodiment of the disclosure, when the electronic device 300 is in the flat state (e.g., FIG. 3A), the first housing structure 311 and the second housing structure 312 may be disposed to form an angle of about 180 degrees therebetween, facing in the same direction. The surface of the first region 321 and the surface of the second region 322 of the display 320 may form about 180 degrees therebetween and may face in the same direction (e.g., the direction of the front surface of the electronic device). The folding region 323 may be substantially coplanar with the first region 321 and the second region 322.

As an embodiment of the disclosure, when the electronic device 300 is in the folded state (e.g., FIG. 3B), the first housing structure 311 and the second housing structure 312 may be disposed to face each other. The surface of the first region 321 and the surface of the second region 322 of the display 320 may face each other at a narrow angle (e.g., 0 degrees to about 10 degrees) therebetween. At least a portion of the folding region 323 may be formed of a curved surface having a predetermined curvature.

As an embodiment of the disclosure, when the electronic device 300 is in an intermediate state, the first housing structure 311 and the second housing structure 312 may be disposed at a certain angle therebetween.

The electronic device according to various embodiments of this document may include electronic devices, such as a bar type electronic device, a foldable type electronic device, a rollable type electronic device, a sliding type electronic device, a wearable type electronic device, a tablet PC, and/or a notebook PC. The electronic device 300 according to various embodiments of this document is not limited to the above-described example and may include various other electronic devices.

Figure 4A:
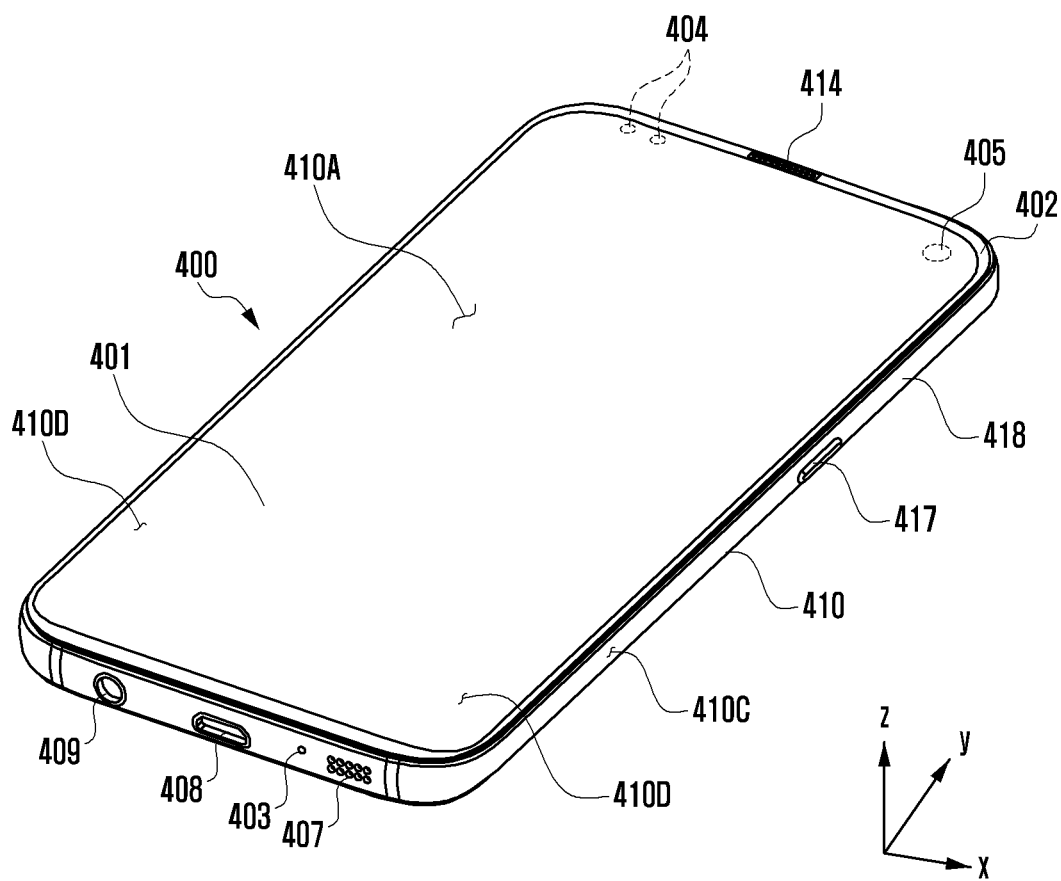
FIG. 4A is a perspective view illustrating a front surface of an electronic device according to an embodiment of the disclosure.
Figure 4B:
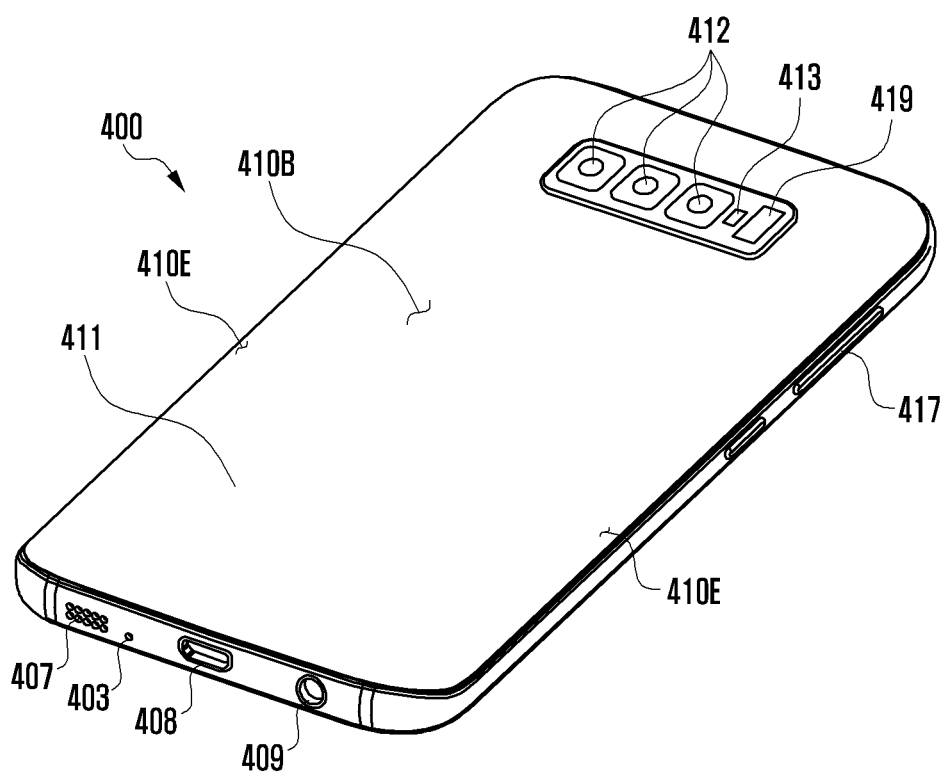
FIG. 4B is a perspective view illustrating a rear surface of an electronic device according to an embodiment of the disclosure.

FIG. 4A is a perspective view illustrating a front surface of an electronic device according to an embodiment of the disclosure. FIG. 4B is a perspective view illustrating a rear surface of an electronic device according to an embodiment of the disclosure.

Referring to FIGS. 4A and 4B, an electronic device 400 (e.g., the electronic device 101 in FIG. 1) according to various embodiments of the disclosure may include a first surface (or front surface) 410A, a second surface (or rear surface) 410B), and a housing 410. A display 401 (e.g., the display module 160 in FIG. 1) may be disposed in a space formed by the housing 410. The housing 410 may include a side surface 410C surrounding the space between the first surface 410A and the second surface 410B. In another embodiment of the disclosure, the housing 410 may refer to a structure that forms a part of the first surface 410A, the second surface 410B, and the side surface 410C.

According to an embodiment of the disclosure, the first surface 410A may be formed using a front plate 402 (e.g., a glass plate including various coating layers or a polymer plate) at least a portion of which is substantially transparent.

According to an embodiment of the disclosure, the second surface 410B may be formed using a substantially opaque rear plate 411. The rear plate 411 may be formed of, for example, coated or tinted glass, ceramic, polymer, metal (e.g., aluminum, stainless steel (STS), or magnesium), or a combination of at least two of the above materials. However, the rear plate 411 is not limited thereto and may be formed of transparent glass.

According to an embodiment of the disclosure, the side surface 410C may be coupled to the front plate 402 and the rear plate 411 and may be formed by a side bezel structure 418 (or a "side member") including metal and/or polymer. In some embodiments of the disclosure, the rear plate 411 and the side bezel structure 418 may be integrally formed and include the same material (e.g., a metal material, such as aluminum).

As an embodiment of the disclosure, the front plate 402 may include two first regions 410D that seamlessly extend to be bent from the first surface 410A toward the rear plate 411. The two first regions 410D may be disposed at long edges of the front plate 402 on both sides thereof.

As an embodiment of the disclosure, the rear plate 411 may include two second regions 410E that seamlessly extend to be bent from the second surface 410B toward the front plate 402.

In some embodiments of the disclosure, the front plate 402 (or the rear plate 411) may include only one of the first regions 410D (or the second regions 410E). In some embodiments of the disclosure, some of the first regions 410D or the second regions 410E may be excluded. In embodiments of the disclosure, when viewed from the side of the electronic device 400, the side bezel structure 418 may have a first thickness (or width) on the side surface that does not include the first regions 410D or the second regions 410E and have a second thickness, which is less than the first thickness, on the side surface that includes the first regions 410D or the second regions 410E.

According to an embodiment of the disclosure, the electronic device 400 may include at least one or more of a display 401 (e.g., the display module 160 in FIG. 1), a sound input device 403 (e.g., the input module 150 in FIG. 1), sound output devices 407 and 414 (e.g., the sound output module 155 in FIG. 1), sensor modules 404 and 419 (e.g., the sensor module 176 in FIG. 1), camera modules 405 and 412 (e.g., the camera module 180 in FIG. 1), a flash 413, a key input device 417, an indicator (not shown), and connectors 408 and 409. In some embodiments of the disclosure, the electronic device 400 may exclude at least one (e.g., the key input device 417) of the elements or further include other elements.

According to an embodiment of the disclosure, the display 401 (e.g., the display module 160 in FIG. 1) may be visually seen through an upper portion of the front plate 402. In some embodiments of the disclosure, at least a portion of the display 401 may be visible through the front plate 402 forming the first surface 410A and the first region 410D of the side surface 410C. The display 401 may be coupled to or disposed adjacent to a touch detection circuit, a pressure sensor capable of measuring the intensity (pressure) of a touch, and/or a digitizer detecting a magnetic field type stylus pen.

In some embodiments of the disclosure, at least one of a sensor module 404, a camera module 405 (e.g., an image sensor), an audio module 414, and a fingerprint sensor may be included in the rear surface of a screen display area of the display 401.

According to some embodiments of the disclosure, the display 401 may be coupled to or disposed adjacent to a touch detection circuit, a pressure sensor capable of measuring the intensity (pressure) of a touch, and/or a digitizer detecting a magnetic field type stylus pen.

According to some embodiments of the disclosure, at least a portion of the sensor modules 404 and 419 and/or at least a portion of the key input device 417 may be disposed in the first regions 410D and/or the second regions 410E.

According to an embodiment of the disclosure, the sound input device 403 may include a microphone. In some embodiments of the disclosure, the input device 403 may include a plurality of microphones disposed to detect the direction of sound. The sound output devices 407 and 414 may include an external speaker 407 and a receiver for calls (e.g., the audio module 414). In some embodiments of the disclosure, the sound input device 403 (e.g., a microphone), the sound output devices 407 and 414, and the connectors 408 and 409 may be disposed in the inner space of the electronic device 400 and exposed to the external environment through at least one hole formed in the housing 410. In some embodiments of the disclosure, the hole formed in the housing 410 may be commonly used for the sound input device 403 (e.g., a microphone) and the sound output devices 407 and 414. In some embodiments of the disclosure, the sound output devices 407 and 414 may include a speaker (e.g., a piezo speaker) that operates without the hole formed in the housing 410.

According to an embodiment of the disclosure, the sensor modules 404 and 419 (e.g., the sensor module 176 in FIG. 1) may produce electrical signals or data values corresponding to the internal operation states of the electronic device 400 or external environmental states. The sensor modules 404 and 419 may include, for example, a first sensor module 404 (e.g., a proximity sensor) disposed on the first surface 410A of the housing 410, and/or a second sensor module 419 (e.g., a heart rate monitor (HRM) sensor) and/or a third sensor module (not shown) (e.g., a fingerprint sensor) disposed in the second surface 410B of the housing 410. For example, the fingerprint sensor may be disposed on the first surface 410A (e.g., the display 401) and/or the second surface 410B of the housing 410. The electronic device 400 may include at least one of sensor modules that are not shown, such as a gesture sensor, a gyro sensor, an atmosphere pressure sensor, a magnetic sensor, an acceleration sensor, a grip sensor, a color sensor, an IR (infrared) sensor, a biometric sensor, a temperature sensor, a humidity sensor, or an illuminance sensor.

According to an embodiment of the disclosure, the camera modules 405 and 412 may include a first camera module 405 disposed on the first surface 410A of the electronic device 400, and a second camera module 412 disposed on the second surface 410B thereof. A flash 413 may be disposed around the camera modules 405 and 412. The camera modules 405 and 412 may include one or more lenses, an image sensor, and/or an image signal processor. The flash 413 may include, for example, a light-emitting diode or a xenon lamp.

As an embodiment of the disclosure, the first camera module 405 may be disposed under a display panel of the display 401 in an under-display camera (UDC) manner. In some embodiments of the disclosure, two or more lenses (wide-angle and telephoto lenses) and image sensors may be disposed on one surface of the electronic device 400. In some embodiments of the disclosure, a plurality of first camera modules 405 may be disposed on the first surface (e.g., the surface on which a screen is displayed) of the electronic device 400 in an under-display camera (UDC) manner.

As an embodiment of the disclosure, the key input device 417 may be disposed on the side surface 410C of the housing 410. In another embodiment of the disclosure, the electronic device 400 may exclude some or all of the above-mentioned key input devices 417, and the excluded key input device 417 may be implemented in another form, such as a soft key or the like on the display 401. In some embodiments of the disclosure, the key input device 417 may be implemented using a pressure sensor included in the display 401.

In an embodiment of the disclosure, the connectors 408 and 409 may include a first connector hole 408 capable of receiving a connector (e.g., a USB connector) for transmitting and receiving power and/or data to and from an external electronic device, and a second connector hole 409 (or an earphone jack) capable of receiving a connector for transmitting and receiving an audio signal to and from an external electronic device. The first connector hole 408 may include a universal serial bus (USB) type-A or a USB type-C port. In the case where the first connector hole 408 supports USB type-C, the electronic device 400 (e.g., the electronic device 101 in FIG. 1) may support USB power delivery (PD) charging.

As an embodiment of the disclosure, some camera modules 405 of the camera modules 405 and 412 and/or some sensor modules 404 of the sensor modules 404 and 419 may be disposed to be visible through the display 401. As another example, in the case where the camera module 405 is disposed in an under-display camera (UDC) manner, the camera module 405 may not be visible to the outside.

As an embodiment of the disclosure, the camera module 405 may be disposed to overlap the display area and may also display a screen in the display area corresponding to the camera module 405. Some sensor modules 404 may be disposed in the inner space of the electronic device to perform their functions without being visually exposed through the front plate 402.

Figure 5:
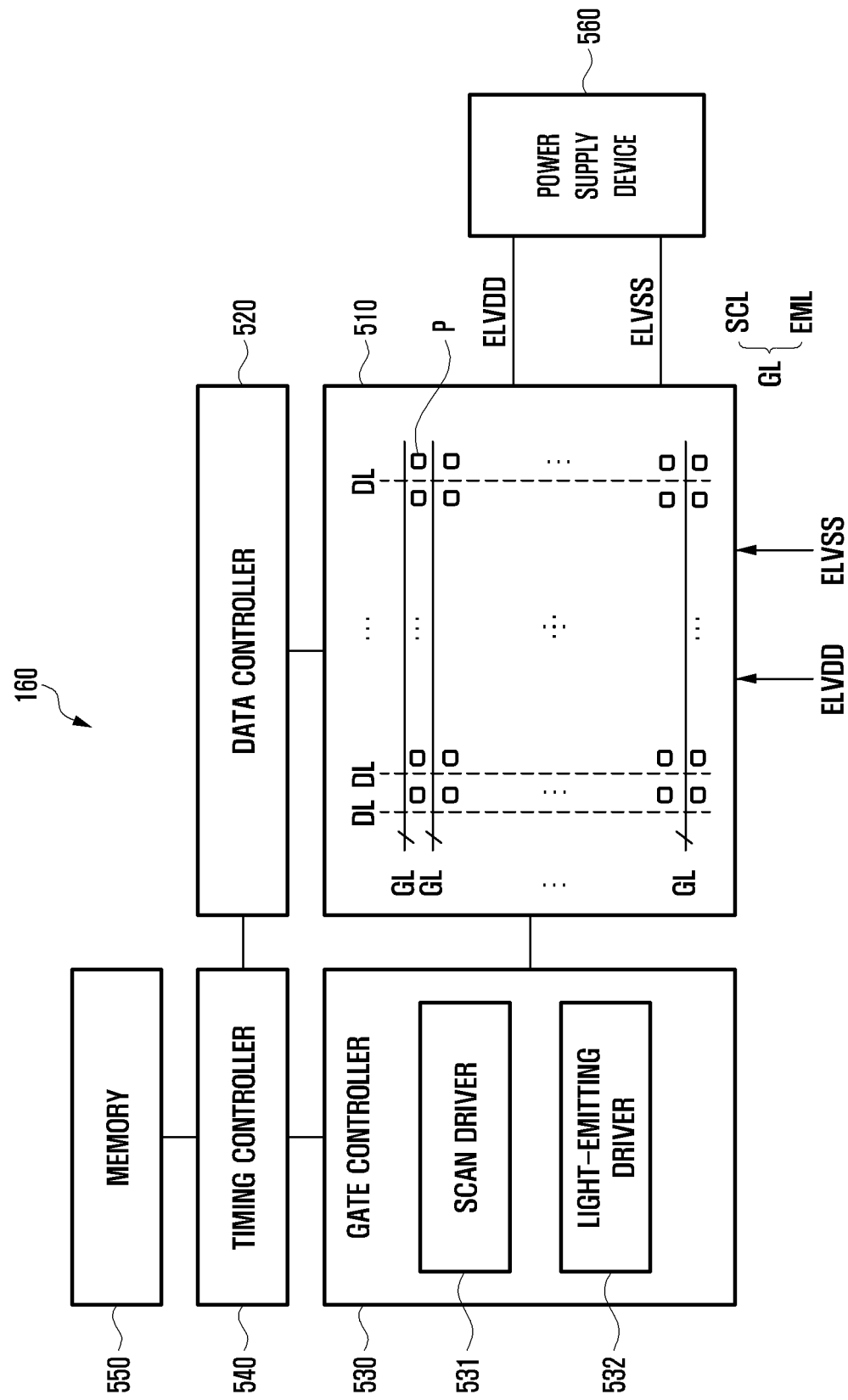
FIG. 5 is a block diagram of a display module according to an embodiment of the disclosure.

FIG. 5 is a block diagram of a display module according to an embodiment of the disclosure.

The display module 160 shown in FIG. 5 may be at least partially similar to the display module 160 shown in FIGS. 1 and/or 2 or may include other embodiments.

Figure 6:
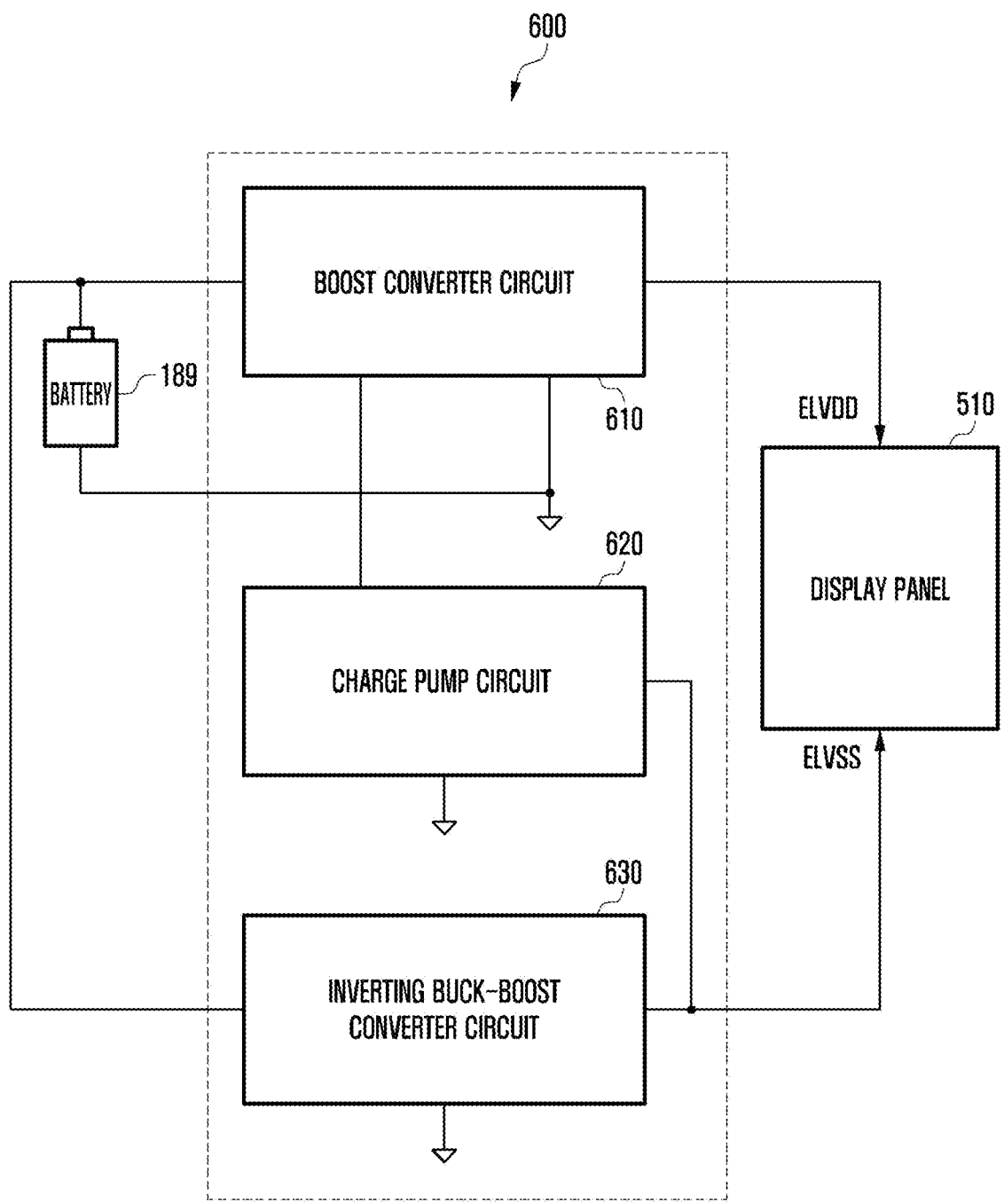
FIG. 6 is a diagram illustrating a power supply device of an electronic device according to an embodiment of the disclosure.

Referring to FIG. 5, a display module 160 according to an embodiment may include a display panel 510, a data controller 520, a gate controller 530, a timing controller 540, a memory 550 (e.g., a dynamic random access memory (DRAM)), and a power supply device 560 (e.g., a power supply device 600 in FIG. 6).

According to various embodiments of the disclosure, at least some of the data controller 520, the gate controller 530, the timing controller 540, and/or the memory 550 (e.g., DRAM) may be disposed in a DDI (e.g., the DDI 230 in FIG. 2).

According to an embodiment of the disclosure, the data controller 520, the timing controller 540, and/or the memory 550 (e.g., DRAM) may be disposed in the DDI 230 (e.g., the DDI 230 in FIG. 2). The gate controller 530 may be disposed in a non-display area (e.g., a bezel area) of the display panel 510.

According to an embodiment of the disclosure, the display panel 510 may include a plurality of gate lines (GL) and a plurality of data lines (DL).

According to an embodiment of the disclosure, the plurality of data lines DL may be formed in, for example, a first direction (e.g., the vertical direction in FIG. 5) and disposed at a predetermined interval.

According to an embodiment of the disclosure, the plurality of gate lines GL may be formed in a second direction (e.g., the horizontal direction in FIG. 5) substantially perpendicular to the first direction and disposed at a predetermined interval.

In various embodiments of the disclosure, a "scan direction of the display panel 510" may be defined as a vertical direction (e.g., the horizontal direction in FIG. 5) in which the gate lines GL are formed. For example, in the case where a plurality of gate lines GL is formed in a second direction (e.g., the horizontal direction in FIG. 5), the scan direction of the display panel 510 may be defined as a first direction (e.g., the vertical direction in FIG. 5) substantially perpendicular to the second direction.

According to an embodiment of the disclosure, a pixel P may be disposed in each of some areas of the display panel 510 where the plurality of gate lines GL and the plurality of data lines DL intersect. According to an embodiment of the disclosure, each pixel P may be electrically connected to the gate line GL and the data line DL to display a specified gray scale.

As an embodiment of the disclosure, the power supply device 560 may generate driving voltages ELVDD and ELVSS for emitting light from the plurality of pixels P disposed on the display panel 510. The power supply device 560 may supply driving voltages ELVDD and ELVSS to the display panel 510.

According to an embodiment of the disclosure, each pixel P may receive a gate scan signal and a light-emitting signal through the gate line GL and receive a data signal through the data line DL. According to an embodiment of the disclosure, each pixel P may receive a positive-level voltage (e.g., ELVDD voltage) and a negative-level voltage (e.g., ELVSS voltage) as power for driving an organic light-emitting diode (OLED).

According to an embodiment of the disclosure, each pixel P may include an OLED and a pixel driving circuit (not shown) for driving the OELD.

According to an embodiment of the disclosure, the pixel driving circuit disposed in each pixel P may control an on-state (e.g., an active state) or off-state (e.g., an inactive state) of the OLED, based on the gate scan signal and the light-emitting signal.

According to an embodiment of the disclosure, the OLED of each pixel P in the on-state (e.g., an active state) may display a gray scale (e.g., luminance) corresponding to a data signal for a period of one frame.

According to an embodiment of the disclosure, the data controller 520 may drive the plurality of data lines DL. According to an embodiment of the disclosure, the data controller 520 may receive at least one synchronization signal and data signal (e.g., digital image data) from the timing controller 540 or a processor (e.g., the processor 120 in FIG. 1). According to an embodiment of the disclosure, the data controller 520 may determine a data voltage (e.g., analog image data) corresponding to the input data signal using a reference gamma voltage and a specified gamma curve. According to an embodiment of the disclosure, the data controller 520 may apply the data voltage to the plurality of data lines DL, thereby supplying the data voltage to each pixel P.

According to an embodiment of the disclosure, the data controller 520 may receive a plurality of synchronization signals having the same frequency or different frequencies from the timing controller 540 or the processor 120 (e.g., the processor 120 in FIG. 1).

According to an embodiment of the disclosure, the processor 120 may control independently a first driving frequency (e.g., 120 hertz (Hz)) of an execution screen of a first application displayed through a first portion (e.g., the first region 321 in FIG. 3A) and a second driving frequency (e.g., 60 Hz) of an execution screen of a second application displayed through a second portion (e.g., the second region 322 in FIG. 3A).

According to an embodiment of the disclosure, the gate controller 530 may drive the plurality of gate lines GL. According to an embodiment of the disclosure, the gate controller 530 may receive at least one synchronization signal from the timing controller 540 or the processor (e.g., the processor 120 in FIG. 1).

According to an embodiment of the disclosure, the gate controller 530 may include a scan driver 531 (e.g., a gate driver) that sequentially generates a plurality of gate scan signals, based on the synchronization signal, and supplies the plurality of generated gate scan signals to the gate lines GL.

According to an embodiment of the disclosure, the gate controller 530 may include a light-emitting driver 532 that sequentially generates a plurality of light-emitting signals, based on the synchronization signal, and supplies the plurality of generated light-emitting signals to the gate lines GL.

For example, each gate line GL may include a gate signal line (SCL) to which a gate scan signal is applied and/or a light-emitting signal line (EML) to which a light-emitting signal is applied.

According to an embodiment of the disclosure, the gate controller 530 may receive the same frequency synchronization signal from the timing controller 540 or the processor 120 (e.g., the processor 120 in FIG. 1). As an embodiment of the disclosure, the gate controller 530 may apply a gate scan signal and/or a light-emitting signal corresponding to the first driving frequency (e.g., 120 Hz) to some gate lines GL corresponding to the first portion (e.g., the first region 321 in FIG. 3A), among the plurality of gate lines GL. In addition, a gate scan signal and/or a light-emitting signal corresponding to the first driving frequency (e.g., 120 Hz) may be applied to some gate lines GL corresponding to the second portion (e.g., the second region 322 in FIG. 3A), among the plurality of gate lines GL.

As another embodiment of the disclosure, the gate controller 530 may receive a plurality of synchronization signals having different frequencies from the timing controller 540 or the processor 120 (e.g., the processor 120 in FIG. 1). As an embodiment of the disclosure, the gate controller 530 may apply a gate scan signal and/or a light-emitting signal corresponding to the first driving frequency (e.g., 120 Hz) to some gate lines GL corresponding to the first portion (e.g., the first region 321 in FIG. 3A), among the plurality of gate lines GL. In addition, a gate scan signal and/or a light-emitting signal corresponding to the second driving frequency (e.g., 60 Hz) may be applied to some gate lines GL corresponding to the second portion (e.g., the second region 322 in FIG. 3A), among the plurality of gate lines GL.

According to an embodiment of the disclosure, the timing controller 540 may control the driving timing of the gate controller 530 and the data controller 520. According to an embodiment of the disclosure, the timing controller 540 may obtain a data signal (e.g., digital image data) corresponding to one frame. According to an embodiment of the disclosure, the timing controller 540 may receive a data signal corresponding to one frame from the processor 120. According to an embodiment of the disclosure, the timing controller 540 may refer to the memory 550 (e.g., DRAM) storing a data signal of the previous frame such that at least a portion of the display panel 510 may display an image of the previous frame, based on a specified event.

According to an embodiment of the disclosure, the timing controller 540 may convert the obtained data signal (e.g., digital image data) to correspond to the resolution of the display panel 510 and supply the converted data signal to the data controller 520.

Figure 7:
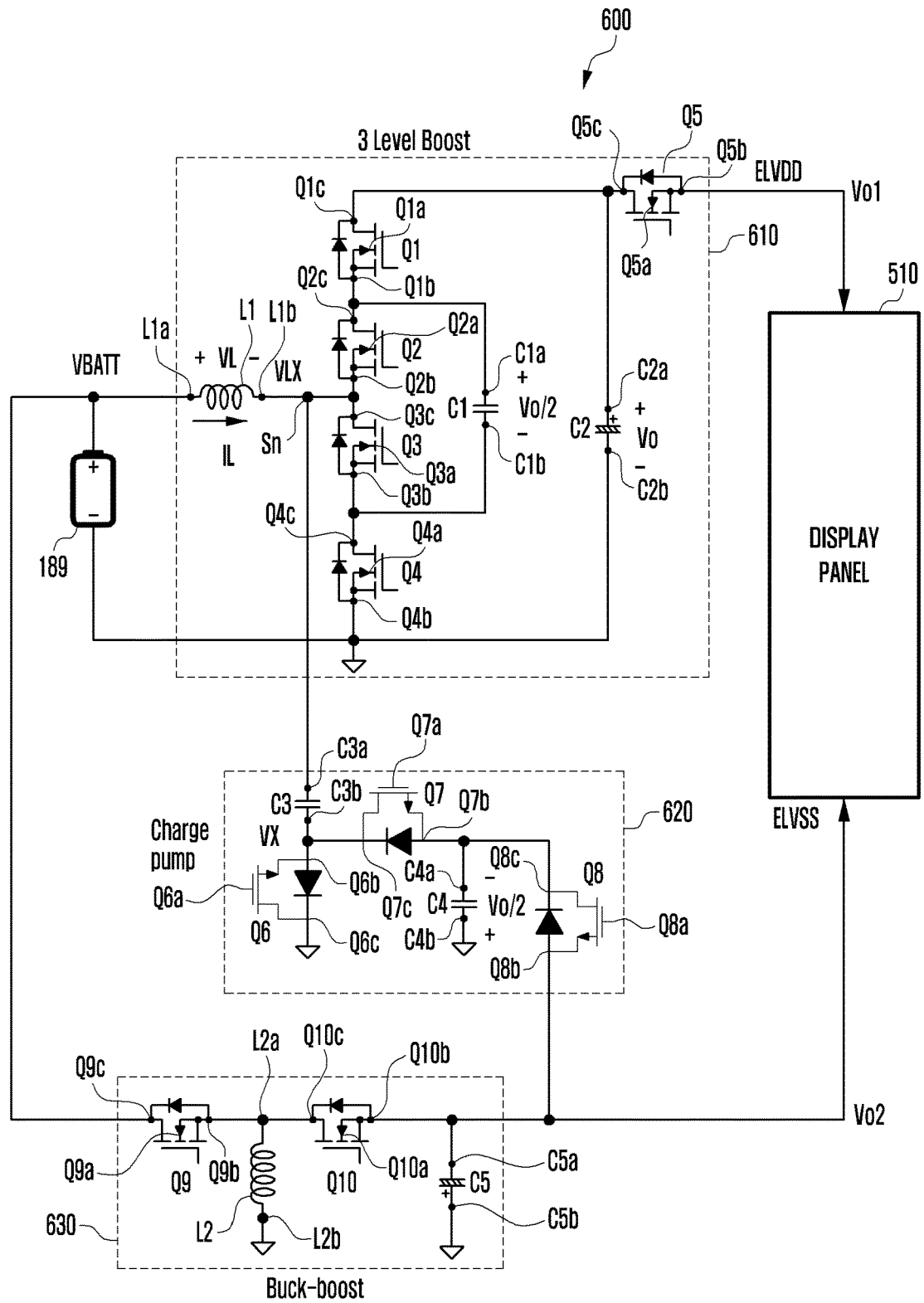
FIG. 7 is a diagram illustrating a boost converter circuit, a charge pump circuit, and an inverting buck-boost converter circuit of the power supply device shown in FIG. 6 according to an embodiment of the disclosure.

FIG. 6 is a diagram illustrating a power supply device of an electronic device according to an embodiment of the disclosure. FIG. 7 is a diagram illustrating a boost converter circuit, a charge pump circuit, and an inverting buck-boost converter circuit of the power supply device shown in FIG. 6 according to an embodiment of the disclosure.

Referring to FIGS. 6 and 7, a power supply device 600 (e.g., the power supply device 560 in FIG. 5) according to various embodiments of the disclosure may include a boost converter circuit 610, a charge pump circuit 620, and an inverting buck-boost converter circuit 630.

According to an embodiment of the disclosure, the power supply device 600 may generate power for driving the OLED of each pixel disposed on the display panel 510. As an embodiment of the disclosure, the power supply device 600 may generate a positive-level voltage (e.g., ELVDD voltage) and a negative-level voltage (e.g., ELVSS voltage) from the power (e.g., DC power) input from the battery 189. The positive-level voltage (e.g., ELVDD voltage) and the negative-level voltage (e.g., ELVSS voltage) may be supplied to the display panel 510.

As an embodiment of the disclosure, the boost converter circuit 610 is a three-level booster and may output voltages of a switching node VLX in three levels. The boost converter circuit 610 may output a first voltage equal to the output voltage Vo, a second voltage Vo/2 corresponding to half of the output voltage Vo, and a third voltage of 0V to the switching node VLX.

As an embodiment of the disclosure, a positive-level voltage (e.g., ELVDD voltage) may be supplied to the display panel 510 from the voltage input from the battery 189 depending on a display mode (e.g., a normal display mode or a low-power display mode) of an electronic device (e.g., the electronic device 101 in FIG. 1, the electronic device 300 in FIG. 3A, or the electronic device 400 in FIG. 4A). In addition, a negative-level voltage (e.g., ELVSS voltage) of −Vo (e.g., about −4.6 V) or −Vo/2 (e.g., about −2.3 V) may be supplied to the display panel 510 depending on the display mode (e.g., the normal display mode or the low-power display mode) of the electronic device.

As an embodiment of the disclosure, the charge pump circuit 620 may be connected to an output node sn of a first inductor L1 of the boost converter circuit 610 and an output node of the inverting buck-boost converter circuit 630. The output node sn of the first inductor L1 of the boost converter circuit 610 may be a switching node VLX. The charge pump circuit 620 may invert the polarity of an output current (e.g., about 10 mA) of the switching node VLX (e.g., invert a positive voltage to a negative voltage).

As an embodiment of the disclosure, in the normal display mode of the electronic device (e.g., the electronic device 101 in FIG. 1, the electronic device 300 in FIG. 3A, or the electronic device 400 in FIG. 4A), the processor (e.g., the processor 120 in FIG. 1) may control a DDI (e.g., the DDI 230 in FIG. 2) to display a screen in the normal display mode on the display panel 510. In the normal display mode, the processor (e.g., the processor 120 in FIG. 1) may operate the boost converter circuit 610 to supply ELVDD (e.g., −4.6V) power to the display panel 510. In addition, in the normal display mode, the processor (e.g., the processor 120 in FIG. 1) may operate the inverting buck-boost converter circuit 630 to supply ELVSS (e.g., −4.6V) power to the display panel 510. As an example of the inverting buck-boost converter circuit 630, various types of converters capable of generating negative-level voltages (e.g., ELVSS voltage) may be applied.

As an embodiment of the disclosure, in the low-power display (e.g., an AOD) mode of the electronic device (e.g., the electronic device 101 in FIG. 1, the electronic device 300 in FIG. 3A, or the electronic device 400 in FIG. 4A), the processor (e.g., the processor 120 in FIG. 1) may control the DDI (e.g., the DDI 230 in FIG. 2) to display a screen in the low-power mode on the display panel 510. In the low-power display (e.g., an AOD) mode, the processor (e.g., the processor 120 in FIG. 1) may operate the boost converter circuit 610 to supply ELVDD (e.g., 4.6 V) power to the display panel 510. In addition, in the low-power display mode, the processor (e.g., the processor 120 in FIG. 1) may operate the charge pump circuit 620 to supply power of −Vo/2 (e.g., −2.3

V) to the display panel 510 and may stop the operation of the inverting buck-boost converter circuit 630.

According to an embodiment of the disclosure, the boost converter circuit 610 may include a first inductor L1, a first switch Q1, a second switch Q2, a third switch Q3, a fourth switch Q4, a fifth switch Q5 (e.g., a reverse blocking metal-oxide-semiconductor field-effect transistor (MOSFET)), a first capacitor C1 (e.g., a flying capacitor), and a second capacitor C2 (e.g., an output capacitor).

According to an embodiment of the disclosure, the charge pump circuit 620 may include a sixth switch Q6, a seventh switch Q7, a third capacitor C3, a fourth capacitor C4 (e.g., a rectifier capacitor), and an eighth switch Q8 (e.g., a rectifier diode).

According to an embodiment of the disclosure, the inverting buck-boost converter circuit 630 may include a ninth switch Q9, a tenth switch Q10, a second inductor L2, and a fifth capacitor C5 (e.g., an output capacitor).

As an embodiment of the disclosure, a first terminal L1a of the first inductor L1 of the boost converter circuit 610 may be electrically connected to the battery 189 VBATT. A second terminal L1b of the first inductor L1 may be electrically connected to the switching node VLX. The first switch Q1, the second switch Q2, the third switch Q3, and the fourth switch Q4 may be connected in series. A switching control voltage may be supplied to a first terminal Q1a (e.g., a gate) of the first switch Q1, a first terminal Q2a (e.g., a gate) of the second switch Q2, a first terminal Q3a (e.g., a gate) of the third switch Q3, a first terminal Q4a (e.g., a gate) of the fourth switch Q4, and a first terminal Q5a (e.g., a gate) of the fifth switch Q5 under the control of the processor (e.g., the processor 120 in FIG. 1). For example, MOSFETs (e.g., n-type MOSFETs) may be applied to the first switch Q1, the second switch Q2, the third switch Q3, the fourth switch Q4, and the fifth switch Q5. A third terminal Q1c of the first switch Q1 may be electrically connected to a third terminal Q5c of the fifth switch Q5 and a first terminal C2a of the second capacitor C2. A second terminal Q2b (e.g., a source) of the second switch Q2 and a third terminal Q3c (e.g., a drain) of the third switch Q3 may be electrically connected to the switching node VLX. A first terminal C1a of the first capacitor C1 may be electrically connected to a second terminal Q1b (e.g., a source) of the first switch Q1 and a third terminal Q2c (e.g., a drain) of the second switch Q2. A second terminal C1b of the first capacitor C1 may be electrically connected to a second terminal Q3b (e.g., a source) of the third switch Q3 and a third terminal Q4c (e.g., a drain) of the fourth switch Q4. A second terminal Q4b (e.g., a source) of the fourth switch Q4 may be electrically connected to the ground. A third terminal Q5c of the fifth switch Q5 may be electrically connected to the third terminal Q1c of the first switch Q1 and the first terminal C2a of the second capacitor C2. A second terminal Q5b of the fifth switch Q5 may be connected to a first output terminal Vo1 (e.g., a positive-level voltage (ELVDD voltage) output terminal). The fifth switch Q5 may prevent power of the battery 189 from leaking to the first output terminal Vo1 (e.g., ELVDD output terminal) by passing through the first switch Q1 and the second switch Q2 when the boost circuit does not operate. The first terminal C2a of the second capacitor C2 may be electrically connected to the third terminal Q3c of the first switch Q1 and the third terminal Q5c of the fifth switch Q5. The second terminal C2b of the second capacitor C2 may be electrically connected to the ground.

As an embodiment of the disclosure, a switching control voltage may be supplied to a first terminal Q6a (e.g., a gate) of the sixth switch Q6, a first terminal Q7a (e.g., a gate) of the seventh switch Q7, and a first terminal Q8a (e.g., a gate) of the eighth switch Q8 of the charge pump circuit 620 under the control of the processor (e.g., the processor in FIG. 1). For example, a first terminal C3a of the third capacitor C3 of the charge pump circuit 620 may be electrically connected to the switching node VLX of the boost converter circuit 610. A second terminal C3b of the third capacitor C3 may be electrically connected to a second terminal Q6b (e.g., a source) of the sixth switch Q6 and a third terminal Q7c (e.g., a drain) of the seventh switch Q7. A third terminal Q6c (e.g., a drain) of the sixth switch Q6 may be electrically connected to the ground. A first terminal C4a of the fourth capacitor C4 may be electrically connected to a second terminal Q7b (e.g., a source) of the seventh switch Q7 and a third terminal Q8c (e.g., a drain) of the eighth switch Q8. A second terminal C4b of the fourth capacitor C4 may be electrically connected to the ground. The eighth switch Q8 may operate as a diode. A second terminal Q8b of the eighth switch Q8 may be electrically connected to the second output terminal Vo2 (e.g., a negative-level voltage (ELVSS voltage) output terminal). A third terminal Q8c of the eighth switch Q8 may be electrically connected to the second terminal Q7b of the seventh switch Q7 and the first terminal C4a of the fourth capacitor C4.

As an embodiment of the disclosure, a switching control voltage may be supplied to a first terminal Q9a (e.g., a gate) of the ninth switch Q9 and a first terminal Q10a (e.g., a gate) of the tenth switch Q10 of the inverting buck-boost converter circuit 630 under the control of the processor (e.g., the processor in FIG. 1).

A third terminal Q9c (e.g., a drain) of the ninth switch Q9 may be electrically connected to the battery 189. A second terminal Q9b of the ninth switch Q9 may be electrically connected to a first terminal L2a of the second inductor L2 and a third terminal Q10c (e.g., a drain) of the tenth switch Q10. A second terminal L2b of the second inductor L2 may be electrically connected to the ground. A second terminal Q10b of the tenth switch Q10 may be electrically connected to a first terminal C5a of the fifth capacitor C5 and the second output terminal Vo2. A third terminal Q10c of the tenth switch Q10 may be electrically connected to the second terminal Q9b of the ninth switch Q9 and the first terminal L2a of the second inductor L2. A second terminal C5b of the fifth capacitor C5 may be electrically connected to the ground.

In the electronic device according to various embodiments of the disclosure, the operation of the inverting buck-boost converter circuit 630 is stopped in the low-power display (e.g., an AOD) mode, thereby blocking the output of the inverting buck-boost converter circuit 630. Here, the charge pump circuit 620 may supply a voltage of −Vo/2 (e.g., about −2.3 V) to the display panel 510.

As an embodiment of the disclosure, the positive-level voltage (e.g., ELVDD voltage) is controlled to be about 4.6 V, thereby operating the sixth switch Q6 and the seventh switch Q7 of the charge pump circuit 620 as synchronous rectifiers. The sixth switch Q6 and the seventh switch Q7 may operate as synchronous rectifiers to convert the voltage obtained from the charge pump circuit 620 into a negative-level voltage (e.g., ELVSS voltage) of about −2.3 V. The negative-level voltage (e.g., ELVSS voltage) of about −2.3 V may be supplied to the display panel 510. A pulse voltage having a peak-to-peak ripple corresponding to ½ of an output voltage may be formed at the switching node VLX of the boost converter circuit 610. DC power corresponding to ½ of the output voltage may be supplied through the charge pump circuit 620 using the pulse voltage corresponding to ½ of the output voltage.

In the electronic device according to various embodiments of the disclosure, when the display panel 510 operates in a minimum power consumption mode (e.g., an AOD), the operation of the inverting buck-boost converter circuit 630 may be stopped, and the boost converter circuit 610 and the charge pump circuit 620 may be operated. Through this, ELVDD of about 4.6 V and ELVSS of about −2.3 V may be output, thereby solving the problem that the battery usage time is reduced due to the switching loss of the inverting buck-boost converter circuit.

Figure 8:
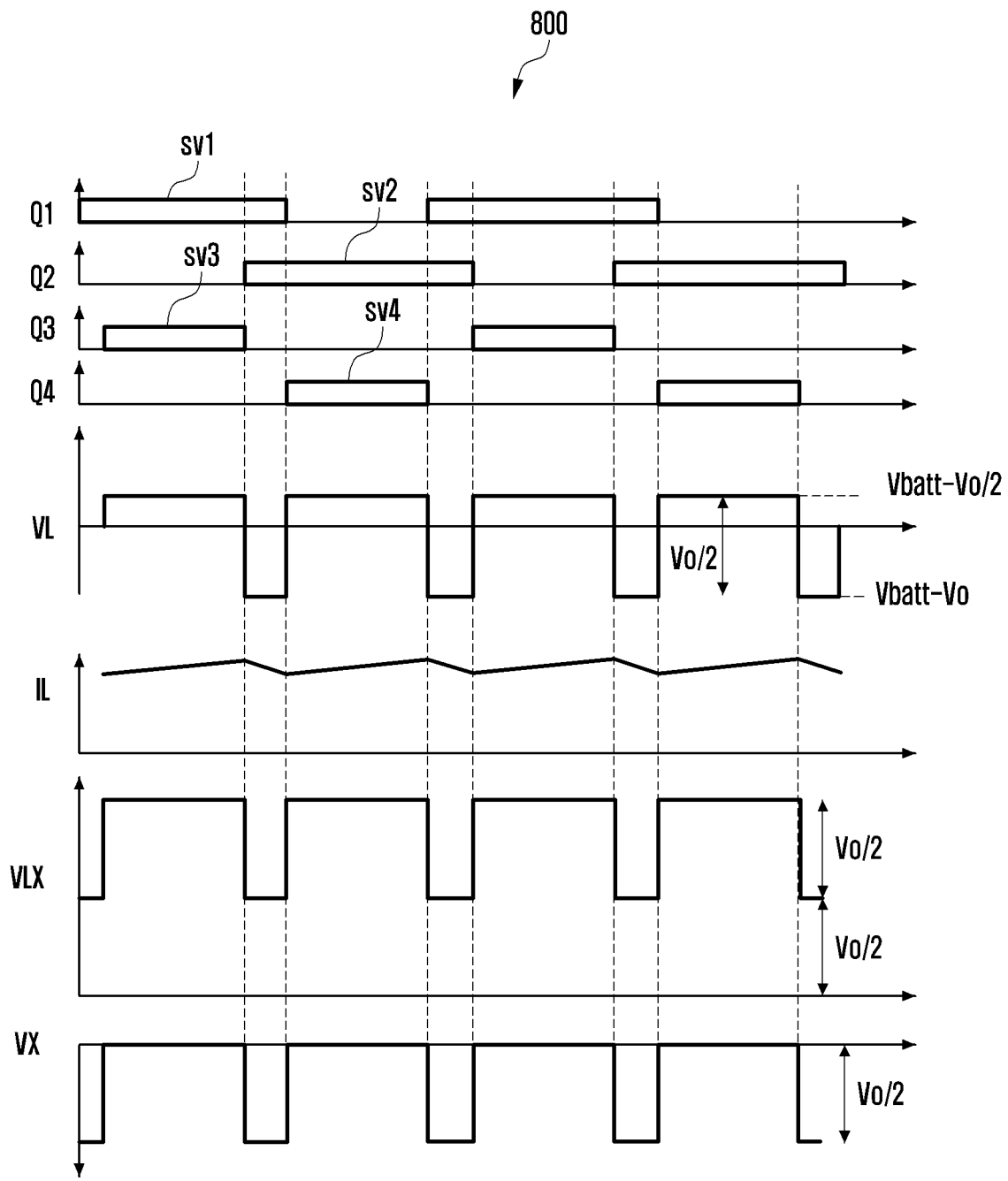
FIG. 8 is a diagram illustrating an operation waveform of a power supply device according to an embodiment of the disclosure.

FIG. 8 is a diagram illustrating an operation waveform 800 of a power supply device according to an embodiment of the disclosure.

Referring to FIGS. 7 and 8, a voltage of the switching node VLX may be output in three levels (e.g., a first voltage equal to the output voltage Vo of the switching node VLX, a second voltage Vo/2 corresponding to half of the output voltage Vo, and a third voltage of 0V) by drive signals sv1~sv4 input to the first terminal Q1a (e.g., a gate) of the first switch Q1, the first terminal Q2a (e.g., a gate) of the second switch Q2, the first terminal Q3a (e.g., a gate) of the third switch Q3, and the first terminal Q4a (e.g., a gate) of the fourth switch Q4 of the boost converter circuit 610.

As an embodiment of the disclosure, a first voltage equal to the output voltage Vo, a second voltage Vo/2 corresponding to half of the output voltage Vo, and a third voltage of 0V may be applied to the switching node VLX of the boost converter circuit 610. The second voltage Vo/2 corresponding to half (½) of the output voltage Vo may be maintained by the first capacitor c1 of the boost converter circuit 610.

As an embodiment of the disclosure, the first switch Q1 and the second switch Q2 may operate as diodes having a voltage drop by about 0 V. The third switch Q3 and the fourth switch Q4 may operate as switches (e.g., rectifier MOSFETs) for outputting a three-level voltage.

As an embodiment of the disclosure, when the first switch Q1 and the fourth switch Q4 are turned on at the same time, a short-circuit may occur. Accordingly, a first drive signal sv1 (switching control voltage) input to the first terminal Q1a (e.g., a gate) of the first switch Q1 and a fourth drive signal sv4 (switching control voltage) input to the first terminal Q4a (e.g., a gate) of the fourth switch Q4 may be inverted.

As an embodiment of the disclosure, when the second switch Q2 and the third switch Q3 are turned on at the same time, a short-circuit may occur. Accordingly, a second drive signal sv2 (second switching control voltage) input to the first terminal Q2a (e.g., a gate) of the second switch Q2 and a third drive signal sv3 (third switching control voltage) input to the first terminal Q3a (e.g., a gate) of the third switch Q3 may be inverted.

As an embodiment of the disclosure, the second drive signal sv2 (second switching control voltage) input to the first terminal Q2a (e.g., a gate) of the second switch Q2 may be an inverted signal of the fourth drive signal sv4 (fourth switching control voltage) input to the first terminal Q4a (e.g., a gate) of the fourth switch Q4.

As an embodiment of the disclosure, the first drive signal sv1 may be input to the first terminal Q1a of the first switch Q1 to turn on the first switch Q1, and the third drive signal sv3 may be input to the first terminal Q3a of the third switch Q3 to turn on the third switch Q3. When both the first switch Q1 and the third switch Q3 are turned on, an inductor voltage VL of −Vo/2 may be formed in the first inductor L1, and an inductor current IL may increase for the time during which both the first switch Q1 and the third switch Q3 are turned on. Subsequently, in the on-state of the first switch Q1, the third switch Q3 may be turned off, and the second drive signal sv2 may be input to the first terminal Q2a of the second switch Q2 to turn on the second switch Q2. If the third switch Q3 is turned off and if the second switch Q2 is turned on in the on-state of the first switch Q1, an inductor voltage VL of −Vo may be formed in the first inductor L1, and the inductor current IL may be reduced. Subsequently, in the on-state of the second switch Q2, the fourth drive signal sv4 may be input to the first terminal Q4a of the fourth switch Q4 to turn on the fourth switch Q4. When both the second switch Q2 and the fourth switch Q4 are turned on, an inductor voltage VL of −Vo/2 may be formed in the first inductor L1, and the inductor current IL may increase. The inductor current IL may increase for the time during which the second switch Q2 and the fourth switch Q4 are simultaneously turned on. Subsequently, in the on-state of the second switch Q2, the fourth switch Q4 may be turned off, and the first switch Q1 may be turned on. If the fourth switch Q4 is turned off and if the first switch Q1 is turned on in the on-state of the second switch Q2, an inductor voltage VL of −Vo may be formed in the first inductor L1, and the inductor current IL may be reduced. For example, the difference between the maximum value and the minimum value of the voltage VL formed in the inductor L1 may be Vo/2.

As an embodiment of the disclosure, a pulse voltage Vo/2 having a peak-to-peak ripple corresponding to half (½) of the output voltage Vo may be generated at the switching node VLX of the boost converter circuit 610.

As an embodiment of the disclosure, the charge pump circuit 620 may receive a pulse voltage Vo/2 corresponding to half (½) of the output voltage Vo. A square wave voltage alternating between 0V and the voltage equal to half (½) of the output voltage Vo may be generated at a charge node VX of the charge pump circuit 620. The pulse voltage Vo/2 corresponding to half (½) of the output voltage Vo may be rectified by the fourth capacitor C4 and the eighth switch Q8 (e.g., an ideal diode) to generate a charge voltage (−Vo/2) (e.g., −2.3 V) that is inverted to negative (−) polarity.

As an embodiment of the disclosure, when the display panel 510 operates in the normal display mode, the processor (e.g., the processor 120 in FIG. 1) may perform control such that a drive signal is input to the first terminal Q9a (e.g., a gate) of the ninth switch Q9 of the inverting buck-boost converter circuit 630 and such that a drive signal is input to the first terminal Q10a (e.g., a gate) of the tenth switch Q10. When the ninth switch Q9 and the tenth switch Q10 of the inverting buck-boost converter circuit 630 operate, a negative-level voltage (e.g., ELVSS voltage) of −2 V to −4.4 V may be supplied to the second output node Vo2. When operating in the normal display mode, ELVDD of about 4.6 V and ELVSS of −2 V to −4.4 V may be supplied to the display panel 510. As the negative-level voltage (e.g., ELVSS voltage) of −2 V to −4.4 V is supplied to the second output node Vo2, the eighth switch Q8 of the charge pump circuit 620 may be reversely blocked so that the charge voltage (−Vo/2) (e.g., −2.3 V) generated by the charge pump circuit 620 may not be supplied to the display panel 510.

As an embodiment of the disclosure, when the electronic device enters the low-power display (e.g., an AOD) mode, the processor (e.g., the processor 120 in FIG. 1) may stop the operation of the inverting buck-boost converter circuit 630. For example, when the display panel 510 operates in the low-power display mode, the processor (e.g., the processor 120 in FIG. 1) may perform control such that a drive signal is not input to the first terminal Q9a (e.g., a gate) of the ninth switch Q9 and the first terminal Q10a (e.g., a gate) of the tenth switch Q10 of the inverting buck-boost converter circuit 630, thereby stopping the operation of the inverting buck-boost converter circuit 630.

As an embodiment of the disclosure, when the electronic device enters the low-power display (e.g., an AOD) mode, the processor (e.g., the processor 120 in FIG. 1) may perform control such that a drive signal is input to the first terminal Q6a (e.g., a gate) of the sixth switch Q6 and the first terminal Q7a (e.g., a gate) of the seventh switch Q7 of the charge pump circuit 620. For example, the sixth switch Q6 and the seventh switch Q7 may operate as synchronous rectifiers. When the sixth switch Q6 and the seventh switch Q7 operate, a charge voltage (−Vo/2) (e.g., −2.3 V) may be supplied to the second output node Vo2. Since the inductor is not included in the power conversion of the charge pump circuit 620 and since the circuit is optimized for the output of 10mA, it is possible to supply power in the low-power display (e.g., an AOD) mode to the display panel 510 with high efficiency compared to the inverting buck-boost converter circuit 630.

In the electronic device according to various embodiments of the disclosure, the operation of the inverting buck-boost converter circuit 630 may be stopped in the low-power display (e.g., an AOD) mode, thereby blocking the output of the inverting buck-boost converter circuit 630. Here, the charge pump circuit 620 may supply a voltage of −Vo/2 (e.g., about −2.3 V) to the display panel 510. A positive-level voltage (e.g., ELVDD voltage) may be controlled to about 4.6 V, and the voltage obtained from the charge pump circuit may be converted into a negative-level voltage (e.g., ELVSS voltage) of about −2.3 V. The negative-level voltage (e.g., ELVSS voltage) of about −2.3 V may be supplied to the display panel. A pulse voltage having a peak-to-peak ripple equal to ½ of the output voltage may always be formed at the switching node VLX of the inverting boost converter circuit 610. It is possible to consistently secure a stable power supply corresponding to ½ of the output voltage using a pulse voltage corresponding to ½ of the output voltage. An electronic device and a method of operating the same according to various embodiments of the disclosure may increase the efficiency of a power supply device when an OLED display operates in a minimum power consumption mode (e.g., an AOD), thereby increasing the battery usage time of the electronic device.

An electronic device (e.g., the electronic device 101 in FIG. 1, the electronic device 300 in FIGS. 3A and 3B, or the electronic device 400 in FIGS. 4A and 4B) according to various embodiments of the disclosure may include a display (e.g., the display module 160 in FIGS. 1 and 2) including a display driver integrated circuit (IC) (e.g., the display driver IC 230 in FIG. 2), a power supply device (e.g., the power supply device 600 in FIGS. 6 and 7) configured to supply driving power to the display module 160, a processor (e.g., the processor 120 in FIG. 1) operatively connected to the display driver IC 230 and the power supply device 600, and a memory (e.g., the memory 130 in FIG. 1 or the memory 233 in FIG. 2) operatively connected to the processor 120. The memory 130 or 233 may store instructions that, when executed, cause the processor 120 to control the power supply device 600 to supply different driving power depending on a display mode of the display module 160.

According to an embodiment of the disclosure, the power supply device 600 may include a boost converter circuit (e.g., the boost converter circuit 610 in FIGS. 6 and 7) configured to supply a first output voltage of a first polarity to the display module 160, a charge pump circuit (e.g., the charge pump circuit 620 in FIGS. 6 and 7) configured to output a charge voltage having a magnitude corresponding to ½ of the first output voltage and an inverted second polarity, and an inverting buck-boost converter circuit (e.g., the inverting buck-boost converter circuit 630 in FIGS. 6 and 7) configured to operate or stop depending on the display mode of the display module 160.

According to an embodiment of the disclosure, the processor 120 may be configured, when the display module 160 operates in a low-power display mode, to stop the operation of the inverting buck-boost converter circuit 630 and supply the second voltage of the second polarity to the display module 160.

According to an embodiment of the disclosure, wherein the charge pump circuit 620 may be configured to invert the polarity of a voltage of a switching node of the boost converter circuit 610 and supply the second voltage of the second polarity to the display module 160.

According to an embodiment of the disclosure, the processor 120 may perform control such that a charge voltage of the charge pump circuit 620 is supplied to the display module 160 when the display module 160 operates in the low-power display mode.

According to an embodiment of the disclosure, the first output voltage of 4.6 V may be supplied to the display module 160 when the display module 160 operates in the low-power display mode.

According to an embodiment of the disclosure, a charge voltage of −2.3 V may be supplied to the display module 160 when the display module 160 operates in the low-power display mode.

According to an embodiment of the disclosure, the processor 120 may be configured to operate the inverting buck-boost converter circuit 630 when the display module 160 operates in a normal display mode such that the second output voltage of the second polarity is supplied to the display module 160.

According to an embodiment of the disclosure, the first output voltage of 4.6 V and a charge voltage of −2 V to −4.4 V may be supplied to the display module 160 when the display module 160 operates in the normal display mode.

According to an embodiment of the disclosure, the power supply device 600 may supply the voltage of the second polarity having a first value to the display module 160 when the display module 160 operates in the normal display mode. The voltage of the second polarity having an absolute value smaller than the first value may be supplied to the display module 160 when the display module 160 operates in the low-power display mode.

According to an embodiment of the disclosure, the boost converter circuit 610 may output the first output voltage of the first polarity, a voltage corresponding to ½ of the first output voltage, and a voltage of 0V.

A method of operating an electronic device (e.g., the electronic device 101 in FIG. 1, the electronic device 300 in FIGS. 3A and 3B, or the electronic device 400 in FIGS. 4A and 4B) having a display according to various embodiments of the disclosure may include determining whether the display (e.g., the display module 160 in FIGS. 1 and 2) operates in a normal display mode or a low-power display mode. The driving of a power supply device (e.g., the power supply device 600 in FIGS. 6 and 7) configured to supply driving power to the display module 160 may be controlled to supply different driving power depending on the normal display mode and the low-power mode.

According to an embodiment of the disclosure, the power supply device 600 may include a boost converter circuit (e.g., the boost converter circuit 610 in FIGS. 6 and 7) configured to supply a first output voltage of a first polarity to the display module 160, a charge pump circuit (e.g., the charge pump circuit 620 in FIGS. 6 and 7) configured to output a charge voltage having a magnitude corresponding to ½ of the first output voltage and an inverted second polarity, and an inverting buck-boost converter circuit (e.g., the inverting buck-boost converter circuit 630 in FIGS. 6 and 7) configured to operate or stop depending on the display mode of the display module 160. When the display module 160 operates in the low-power display mode, the operation of the inverting buck-boost converter circuit 630 may be stopped, and the second voltage of the second polarity may be supplied to the display module 160.

According to an embodiment of the disclosure, the polarity of a voltage of a switching node of the boost converter circuit 610 may be inverted so that the second voltage of the second polarity may be supplied to the display module 160.

According to an embodiment of the disclosure, a charge voltage of the charge pump circuit 620 may be supplied to the display module 160 when the display module 160 operates in the low-power display mode.

According to an embodiment of the disclosure, the first output voltage of 4.6 V may be supplied to the display module 160 when the display module 160 operates in the low-power display mode.

According to an embodiment of the disclosure, a charge voltage of –2.3 V may be supplied to the display module 160 when the display module 160 operates in the low-power display mode.

According to an embodiment of the disclosure, the inverting buck-boost converter circuit 630 may be operated when the display module 160 operates in the normal display mode such that the second output voltage of the second polarity is supplied to the display module 160.

According to an embodiment of the disclosure, the first output voltage of 4.6 V and a charge voltage of –2 V to –4.4 V may be supplied to the display module 160 when the display module 160 operates in the normal display mode.

According to an embodiment of the disclosure, the voltage of the second polarity having a first value may be supplied to the display module 160 when the display module 160 operates in the normal display mode. The voltage of the second polarity having an absolute value smaller than the first value may be supplied to the display module 160 when the display module 160 operates in the low-power display mode.

According to an embodiment of the disclosure, the operation of the boost converter circuit 610 may be controlled to output the first output voltage of the first polarity, a voltage corresponding to ½ of the first output voltage, and a voltage of 0V.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a display comprising a display driver integrated circuit (IC);
   a power supply device comprising:
   a boost converter circuit configured to supply a first power with a first output voltage and a first polarity,
   a charge pump circuit configured to supply a second power with a second output voltage having an absolute value smaller than an absolute value of the first output voltage and having a second polarity that is inverse to the first polarity, and
   an inverting buck-boost converter circuit configured to supply a third power with a third output voltage having an absolute value greater than the absolute value of the second output voltage and having the second polarity;
   at least one processor operatively connected to the display driver IC and the power supply device; and
   a memory operatively connected to the at least one processor,
   wherein the memory stores instructions that, when executed by the at least one processor, cause the electronic device to:
   in a normal display mode, supply the first power and the third power to the display, and
   in a low-power display mode, supply the first power and the second power to the display,
   wherein an input port of the charge pump circuit through which power is supplied to the charge pump circuit is electrically connected to a second terminal of an inductor of the boost converter circuit, wherein a first terminal of the inductor is electrically connected to a power source,
   wherein an input port of the inverting buck-boost converter circuit is electrically connected to the first terminal of the inductor, and
   wherein an output port of the inverting buck-boost converter circuit is electrically connected to an output port of the charge pump circuit.

2. The electronic device of claim 1, wherein the instructions, when executed by the at least one processor, further cause the power supply device to, in the low-power display mode, stop an operation of the inverting buck-boost converter circuit.

3. The electronic device of claim 1, wherein the charge pump circuit is further configured to invert a polarity of a voltage of a switching node of the boost converter circuit.

4. The electronic device of claim 1, wherein the absolute value of the second output voltage is ½ of the absolute value of the first output voltage.

5. The electronic device of claim 1, wherein the first output voltage is 4.6 V.

6. The electronic device of claim 1, wherein the second output voltage is –2.3 V.

7. The electronic device of claim 1, wherein the instructions, when executed by the at least one processor, further cause the power supply device to, in the normal display mode, operate the inverting buck-boost converter circuit.

8. The electronic device of claim 1, wherein the first output voltage is 4.6 V and the third output voltage is –2 V to –4.4 V.

9. The electronic device of claim 2, wherein the third output voltage has a same absolute value as the absolute value of the first output voltage.

10. The electronic device of claim 1, wherein the boost converter circuit is configured to output the first output voltage of the first polarity, a voltage corresponding to ½ of the first output voltage, and a voltage of 0V.

11. The electronic device of claim 1,
    wherein the boost converter circuit includes the inductor and one or more switches, the first terminal of the inductor being an input of the boost converter circuit through which the power from the power source is supplied at a supply voltage of the first polarity, and the second terminal of the inductor being a switching node of the boost converter circuit that is electrically connected to the one or more switches, and wherein the power from the power source is supplied to the input of the inverting buck-boost converter circuit at the supply voltage of the first polarity.

12. A method performed by an electronic device having a display and a power supply device, the power supply device including a boost converter circuit configured to supply a first power with a first output voltage and a first polarity, a charge pump circuit configured to supply a second power with a second output voltage having an absolute value smaller than an absolute value of the first output voltage and having a second polarity that is inverse to the first polarity, and an inverting buck-boost converter circuit configured to supply a third power with a third output voltage having an absolute value greater than the absolute value of the second output voltage and having the second polarity, the method comprising:

determining whether the display operates in a normal display mode or a low-power display mode; and controlling the power supply device to:
in the normal display mode, supply the first power and the third power to the display, and
in the low-power display mode, supply the first power and second power to the display, wherein an input port of the charge pump circuit through which power is supplied to the charge pump circuit is electrically connected to a second terminal of an inductor of the boost converter circuit, wherein a first terminal of the inductor is electrically connected to a power source, wherein an input port of the inverting buck-boost converter circuit is electrically connected to the first terminal of the inductor, and wherein an output port of the inverting buck-boost converter circuit is electrically connected to an output port of the charge pump circuit.

13. The method of claim 12, wherein, in the low-power display mode, an operation of the inverting buck-boost converter circuit is stopped.

14. The method of claim 12, further comprising:
inverting a polarity of a voltage of a switching node of the boost converter circuit.

15. The method of claim 12, wherein the absolute value of the second output voltage is ½ of the absolute value of the first output voltage.

16. The method of claim 12, wherein the first output voltage is 4.6 V.

17. The method of claim 12, wherein the second output voltage is −2.3 V.

18. The method of claim 12, further comprising:
operating the inverting buck-boost converter circuit in a normal display mode.

19. The method of claim 12, wherein the first output voltage is 4.6 V and the third output voltage is −2 V to −4.4 V.

20. The method of claim 13, wherein the output voltage has a same absolute value as the absolute value of the first output voltage.

21. The method of claim 12, further comprising:
controlling operation of the boost converter circuit to output the first output voltage of the first polarity, a voltage corresponding to ½ of the first output voltage, and a voltage of 0V.

22. The method of claim 12,
wherein the boost converter circuit includes the inductor and one or more switches, the first terminal of the inductor being an input of the boost converter circuit through which the power from the power source is supplied at a supply voltage of the first polarity, and the second terminal of the inductor being a switching node of the boost converter circuit that is electrically connected to the one or more switches, and wherein the power from the power source is supplied to the input of the inverting buck-boost converter circuit at the supply voltage of the first polarity.

* * * * *